＊

US009553927B2

(12) United States Patent
Sharma et al.

(10) Patent No.: US 9,553,927 B2
(45) Date of Patent: Jan. 24, 2017

(54) SYNCHRONIZING MULTIPLE TRANSMISSIONS OF CONTENT

(71) Applicant: COMCAST CABLE COMMUNICATIONS, LLC, Philadelphia, PA (US)

(72) Inventors: Sudhanshu Sharma, Lansdale, PA (US); James D. Mora, Pottwtown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 706 days.

(21) Appl. No.: 13/798,843

(22) Filed: Mar. 13, 2013

(65) Prior Publication Data

US 2014/0280695 A1  Sep. 18, 2014

(51) Int. Cl.
*H04N 7/173*      (2011.01)
*H04N 7/025*      (2006.01)
*H04L 29/08*      (2006.01)
*H04N 21/6332*    (2011.01)
*H04N 21/24*      (2011.01)
*H04N 21/242*     (2011.01)
*H04N 21/8545*    (2011.01)
*H04N 21/41*      (2011.01)

(52) U.S. Cl.
CPC ........ *H04L 67/1095* (2013.01); *H04N 21/242* (2013.01); *H04N 21/2408* (2013.01); *H04N 21/4126* (2013.01); *H04N 21/6332* (2013.01); *H04N 21/8545* (2013.01)

(58) Field of Classification Search
CPC  H04N 21/24; H04N 21/2402; H04N 21/2408; H04N 21/242; H04N 21/442; H04N 21/44209; H04N 21/4622; H04N 21/633; H04N 21/6332
USPC ..................... 725/32, 35, 105, 107, 133, 116
See application file for complete search history.

(56) References Cited

U.S. PATENT DOCUMENTS

| 5,287,489 A | 2/1994 | Nimmo et al. |
| 5,321,750 A | 6/1994 | Nadan |
| 5,353,121 A | 10/1994 | Young et al. |

(Continued)

FOREIGN PATENT DOCUMENTS

| EP | 0624039 A2 | 11/1994 |
| EP | 0963115 A1 | 12/1999 |

(Continued)

OTHER PUBLICATIONS

Canadian Office Action—CA 2,685,833—Dated Jan. 22, 2015.
(Continued)

*Primary Examiner* — James R Sheleheda
(74) *Attorney, Agent, or Firm* — Banner & Witcoff, Ltd.

(57) ABSTRACT

The disclosure relates generally to providing synchronized supplemental content. In one aspect, second user devices may be used to consume supplemental content associated with primary content presented on a first display. The supplemental content may be synchronized with the primary content. Such synchronization may be performed by detecting and reporting triggers within the primary content and transmitting synchronization signals to appropriate second user devices. Another aspect of the disclosure relates to determining which interfaces or applications will report the triggers, and fine-tuning how many interfaces or applications will report the triggers.

23 Claims, 10 Drawing Sheets

(56) References Cited

U.S. PATENT DOCUMENTS

| | | |
|---|---|---|
| 5,485,221 A | 1/1996 | Banker et al. |
| 5,583,563 A | 12/1996 | Wanderscheid et al. |
| 5,589,892 A | 12/1996 | Knee et al. |
| 5,592,551 A | 1/1997 | Lett et al. |
| 5,594,509 A | 1/1997 | Florin et al. |
| 5,613,057 A | 3/1997 | Caravel |
| 5,621,456 A | 4/1997 | Florin et al. |
| 5,657,072 A | 8/1997 | Aristides et al. |
| 5,659,793 A | 8/1997 | Escobar et al. |
| 5,666,645 A | 9/1997 | Thomas et al. |
| 5,675,752 A | 10/1997 | Scott et al. |
| 5,694,176 A | 12/1997 | Bruette et al. |
| 5,802,284 A | 9/1998 | Karlton et al. |
| 5,826,102 A | 10/1998 | Escobar et al. |
| 5,844,620 A | 12/1998 | Coleman et al. |
| 5,850,218 A | 12/1998 | LaJoie et al. |
| 5,852,435 A | 12/1998 | Vigneaux et al. |
| 5,860,073 A | 1/1999 | Ferrel et al. |
| 5,883,677 A | 3/1999 | Hofmann |
| 5,892,902 A | 4/1999 | Clark |
| 5,892,905 A | 4/1999 | Brandt et al. |
| 5,905,492 A | 5/1999 | Straub et al. |
| 5,929,849 A | 7/1999 | Kikinis |
| 5,990,890 A | 11/1999 | Etheredge |
| 5,996,025 A | 11/1999 | Day et al. |
| 6,002,394 A | 12/1999 | Schein et al. |
| 6,005,561 A | 12/1999 | Hawkins et al. |
| 6,008,803 A | 12/1999 | Rowe et al. |
| 6,008,836 A | 12/1999 | Bruck et al. |
| 6,016,144 A | 1/2000 | Blonstein et al. |
| 6,025,837 A | 2/2000 | Matthews, III et al. |
| 6,049,823 A | 4/2000 | Hwang |
| 6,061,695 A | 5/2000 | Slivka et al. |
| 6,067,108 A | 5/2000 | Yokote et al. |
| 6,088,722 A | 7/2000 | Herz et al. |
| 6,091,411 A | 7/2000 | Straub et al. |
| 6,094,237 A | 7/2000 | Hashimoto |
| 6,141,003 A | 10/2000 | Chor et al. |
| 6,148,081 A | 11/2000 | Szymanski et al. |
| 6,162,697 A | 12/2000 | Singh et al. |
| 6,169,543 B1 | 1/2001 | Wehmeyer |
| 6,172,677 B1 | 1/2001 | Stautner et al. |
| 6,177,931 B1 | 1/2001 | Alexander et al. |
| 6,191,781 B1 | 2/2001 | Chaney et al. |
| 6,195,692 B1 | 2/2001 | Hsu |
| 6,205,582 B1 | 3/2001 | Hoarty |
| 6,219,839 B1 | 4/2001 | Sampsell |
| 6,239,795 B1 | 5/2001 | Ulrich et al. |
| 6,240,555 B1 | 5/2001 | Shoff et al. |
| 6,281,940 B1 | 8/2001 | Sciammarella |
| 6,292,187 B1 | 9/2001 | Gibbs et al. |
| 6,292,827 B1 | 9/2001 | Raz |
| 6,295,057 B1 | 9/2001 | Rosin et al. |
| 6,314,569 B1 | 11/2001 | Chernock et al. |
| 6,317,885 B1 | 11/2001 | Fries |
| 6,345,305 B1 | 2/2002 | Beck et al. |
| 6,405,239 B1 | 6/2002 | Addington et al. |
| 6,415,438 B1 | 7/2002 | Blackketter et al. |
| 6,421,067 B1 | 7/2002 | Kamen et al. |
| 6,426,779 B1 | 7/2002 | Noguchi et al. |
| 6,442,755 B1 | 8/2002 | Lemmons et al. |
| 6,477,705 B1 | 11/2002 | Yuen et al. |
| 6,486,920 B2 | 11/2002 | Arai et al. |
| 6,522,342 B1 | 2/2003 | Gagnon et al. |
| 6,529,950 B1 | 3/2003 | Lumelsky et al. |
| 6,532,589 B1 | 3/2003 | Proehl et al. |
| 6,564,263 B1 | 5/2003 | Bergman et al. |
| 6,567,104 B1 | 5/2003 | Andrew et al. |
| 6,571,392 B1 | 5/2003 | Zigmond et al. |
| 6,591,292 B1 | 7/2003 | Morrison et al. |
| 6,621,509 B1 | 9/2003 | Eiref et al. |
| 6,636,887 B1 | 10/2003 | Augeri |
| 6,658,661 B1 | 12/2003 | Arsenault et al. |
| 6,678,891 B1 | 1/2004 | Wilcox et al. |
| 6,684,400 B1 | 1/2004 | Goode et al. |
| 6,731,310 B2 | 5/2004 | Craycroft et al. |
| 6,760,043 B2 | 7/2004 | Markel |
| 6,763,522 B1 | 7/2004 | Kondo et al. |
| 6,766,526 B1 | 7/2004 | Ellis |
| 6,806,887 B2 | 10/2004 | Chernock et al. |
| 6,857,128 B1 | 2/2005 | Borden, IV et al. |
| 6,886,029 B1 | 4/2005 | Pecus et al. |
| 6,910,191 B2 | 6/2005 | Segerberg et al. |
| 6,918,131 B1 | 7/2005 | Rautila et al. |
| 7,028,327 B1 | 4/2006 | Dougherty et al. |
| 7,065,785 B1 | 6/2006 | Shaffer et al. |
| 7,103,904 B1 | 9/2006 | Blackketter et al. |
| 7,114,170 B2 | 9/2006 | Harris et al. |
| 7,134,072 B1 | 11/2006 | Lovett et al. |
| 7,152,236 B1 | 12/2006 | Wugofski et al. |
| 7,162,694 B2 | 1/2007 | Venolia |
| 7,162,697 B2 | 1/2007 | Markel |
| 7,197,715 B1 | 3/2007 | Valeria |
| 7,207,057 B1 | 4/2007 | Rowe |
| 7,213,005 B2 | 5/2007 | Mourad et |
| 7,221,801 B2 | 5/2007 | Jang et al. |
| 7,237,252 B2 | 6/2007 | Billmaier |
| 7,293,275 B1 | 11/2007 | Krieger et al. |
| 7,305,696 B2 | 12/2007 | Thomas et al. |
| 7,313,806 B1 | 12/2007 | Williams et al. |
| 7,337,457 B2 | 2/2008 | Pack et al. |
| 7,360,232 B2 | 4/2008 | Mitchell |
| 7,363,612 B2 | 4/2008 | Satuloori et al. |
| 7,406,705 B2 | 7/2008 | Crinon et al. |
| 7,440,967 B2 | 10/2008 | Chidlovskii |
| 7,464,344 B1 | 12/2008 | Carmichael et al. |
| 7,516,468 B1 | 4/2009 | Deller et al. |
| 7,523,180 B1 | 4/2009 | DeLuca et al. |
| 7,587,415 B2 | 9/2009 | Gaurav et al. |
| 7,624,416 B1 | 11/2009 | Vandermolen et al. |
| 7,640,487 B2 | 12/2009 | Amielh-Caprioglio et al. |
| 7,702,315 B2 | 4/2010 | Engstrom et al. |
| 7,703,116 B1 | 4/2010 | Moreau et al. |
| 7,721,307 B2 | 5/2010 | Hendricks et al. |
| 7,743,330 B1 | 6/2010 | Hendricks et al. |
| 7,752,258 B2 | 7/2010 | Lewin et al. |
| 7,861,259 B2 | 12/2010 | Barone, Jr. |
| 7,913,286 B2 | 3/2011 | Sarachik et al. |
| 7,958,528 B2 | 6/2011 | Moreau et al. |
| 8,266,652 B2 | 9/2012 | Roberts et al. |
| 8,296,805 B2 | 10/2012 | Tabatabai et al. |
| 8,365,230 B2 | 1/2013 | Chane et al. |
| 8,381,259 B1* | 2/2013 | Khosla ............... H04N 5/04 |
| | | 725/141 |
| 8,448,208 B2 | 5/2013 | Moreau et al. |
| 8,660,545 B1 | 2/2014 | Redford et al. |
| 8,699,862 B1 | 4/2014 | Sharifi et al. |
| 8,793,256 B2 | 7/2014 | McIntire et al. |
| 8,850,495 B2 | 9/2014 | Pan |
| 8,863,196 B2 | 10/2014 | Patil et al. |
| 8,938,675 B2* | 1/2015 | Holladay ......... H04N 21/43615 |
| | | 709/220 |
| 8,973,063 B2* | 3/2015 | Spilo .................. H04N 5/76 |
| | | 725/78 |
| 9,021,528 B2 | 4/2015 | Moreau et al. |
| 2001/0014206 A1 | 8/2001 | Artigalas et al. |
| 2001/0027563 A1 | 10/2001 | White et al. |
| 2001/0049823 A1 | 12/2001 | Matey |
| 2001/0056573 A1 | 12/2001 | Kovac et al. |
| 2001/0056577 A1 | 12/2001 | Gordon et al. |
| 2002/0010928 A1 | 1/2002 | Sahota |
| 2002/0016969 A1 | 2/2002 | Kimble |
| 2002/0023270 A1 | 2/2002 | Thomas et al. |
| 2002/0026642 A1 | 2/2002 | Augenbraun et al. |
| 2002/0041104 A1 | 4/2002 | Graf et al. |
| 2002/0042915 A1 | 4/2002 | Kubischta et al. |
| 2002/0059094 A1 | 5/2002 | Hosea et al. |
| 2002/0059586 A1 | 5/2002 | Carney et al. |
| 2002/0059629 A1 | 5/2002 | Markel |
| 2002/0067376 A1 | 6/2002 | Martin et al. |
| 2002/0069407 A1 | 6/2002 | Fagnani et al. |
| 2002/0070978 A1 | 6/2002 | Wishoff et al. |
| 2002/0078444 A1 | 6/2002 | Krewin et al. |
| 2002/0078449 A1 | 6/2002 | Gordon et al. |

(56) References Cited

U.S. PATENT DOCUMENTS

| | | |
|---|---|---|
| 2002/0083450 A1 | 6/2002 | Kamen et al. |
| 2002/0100041 A1 | 7/2002 | Rosenberg et al. |
| 2002/0107973 A1 | 8/2002 | Lennon et al. |
| 2002/0108122 A1 | 8/2002 | Alao et al. |
| 2002/0120609 A1 | 8/2002 | Lang et al. |
| 2002/0124254 A1 | 9/2002 | Kikinis |
| 2002/0144269 A1 | 10/2002 | Connelly |
| 2002/0144273 A1 | 10/2002 | Reto |
| 2002/0147645 A1 | 10/2002 | Alao et al. |
| 2002/0152477 A1 | 10/2002 | Goodman et al. |
| 2002/0156839 A1 | 10/2002 | Peterson et al. |
| 2002/0169885 A1 | 11/2002 | Alao et al. |
| 2002/0170059 A1 | 11/2002 | Hoang |
| 2002/0171691 A1 | 11/2002 | Currans et al. |
| 2002/0171940 A1 | 11/2002 | He et al. |
| 2002/0184629 A1 | 12/2002 | Sie et al. |
| 2002/0188944 A1 | 12/2002 | Noble |
| 2002/0196268 A1 | 12/2002 | Wolff et al. |
| 2002/0199190 A1 | 12/2002 | Su |
| 2003/0001880 A1 | 1/2003 | Holtz et al. |
| 2003/0005444 A1 | 1/2003 | Crinon et al. |
| 2003/0005453 A1 | 1/2003 | Rodriguez et al. |
| 2003/0014752 A1 | 1/2003 | Zaslavsky et al. |
| 2003/0014753 A1 | 1/2003 | Beach et al. |
| 2003/0018755 A1 | 1/2003 | Masterson et al. |
| 2003/0023970 A1 | 1/2003 | Panabaker |
| 2003/0025832 A1 | 2/2003 | Swart et al. |
| 2003/0028873 A1 | 2/2003 | Lemmons |
| 2003/0041104 A1 | 2/2003 | Wingard et al. |
| 2003/0051246 A1 | 3/2003 | Wilder et al. |
| 2003/0056216 A1 | 3/2003 | Wugofski et al. |
| 2003/0056218 A1 | 3/2003 | Wingard et al. |
| 2003/0058948 A1 | 3/2003 | Kelly et al. |
| 2003/0066081 A1 | 4/2003 | Barone et al. |
| 2003/0067554 A1 | 4/2003 | Klarfeld et al. |
| 2003/0070170 A1 | 4/2003 | Lennon |
| 2003/0079226 A1 | 4/2003 | Barrett |
| 2003/0084443 A1 | 5/2003 | Laughlin et al. |
| 2003/0084444 A1 | 5/2003 | Ullman et al. |
| 2003/0084449 A1 | 5/2003 | Chane et al. |
| 2003/0086694 A1 | 5/2003 | Davidsson |
| 2003/0093790 A1 | 5/2003 | Logan et al. |
| 2003/0093792 A1 | 5/2003 | Labeeb et al. |
| 2003/0097657 A1 | 5/2003 | Zhou et al. |
| 2003/0110500 A1 | 6/2003 | Rodriguez |
| 2003/0110503 A1 | 6/2003 | Perkes |
| 2003/0115219 A1 | 6/2003 | Chadwick |
| 2003/0115612 A1 | 6/2003 | Mao et al. |
| 2003/0126601 A1 | 7/2003 | Roberts et al. |
| 2003/0132971 A1 | 7/2003 | Billmaier et al. |
| 2003/0135464 A1 | 7/2003 | Mourad et al. |
| 2003/0140097 A1 | 7/2003 | Schloer |
| 2003/0151621 A1 | 8/2003 | McEvilly et al. |
| 2003/0158777 A1 | 8/2003 | Schiff et al. |
| 2003/0172370 A1 | 9/2003 | Satuloori et al. |
| 2003/0182663 A1 | 9/2003 | Gudorf et al. |
| 2003/0189668 A1 | 10/2003 | Newnam et al. |
| 2003/0204814 A1 | 10/2003 | Elo et al. |
| 2003/0204846 A1 | 10/2003 | Breen et al. |
| 2003/0204854 A1 | 10/2003 | Blackketter et al. |
| 2003/0207696 A1* | 11/2003 | Willenegger ......... H04W 52/40 455/522 |
| 2003/0226141 A1 | 12/2003 | Krasnow et al. |
| 2003/0229899 A1 | 12/2003 | Thompson et al. |
| 2004/0003402 A1 | 1/2004 | McKenna |
| 2004/0019900 A1 | 1/2004 | Knightbridge et al. |
| 2004/0019908 A1 | 1/2004 | Williams et al. |
| 2004/0025180 A1 | 2/2004 | Begeja et al. |
| 2004/0031015 A1 | 2/2004 | Ben-Romdhane et al. |
| 2004/0031058 A1* | 2/2004 | Reisman ........... G06F 17/30873 725/112 |
| 2004/0039754 A1 | 2/2004 | Harple |
| 2004/0078814 A1 | 4/2004 | Allen |
| 2004/0107437 A1 | 6/2004 | Reichardt et al. |
| 2004/0107439 A1 | 6/2004 | Hassell et al. |
| 2004/0128699 A1 | 7/2004 | Delpuch et al. |
| 2004/0133923 A1 | 7/2004 | Watson et al. |
| 2004/0136698 A1 | 7/2004 | Mock |
| 2004/0172648 A1 | 9/2004 | Xu et al. |
| 2004/0194136 A1 | 9/2004 | Finseth et al. |
| 2004/0199578 A1 | 10/2004 | Kapczynski et al. |
| 2004/0221306 A1 | 11/2004 | Noh |
| 2004/0226051 A1 | 11/2004 | Carney et al. |
| 2005/0005288 A1 | 1/2005 | Novak |
| 2005/0015796 A1 | 1/2005 | Bruckner et al. |
| 2005/0015804 A1 | 1/2005 | LaJoie et al. |
| 2005/0028208 A1 | 2/2005 | Ellis et al. |
| 2005/0086172 A1 | 4/2005 | Stefik |
| 2005/0125835 A1 | 6/2005 | Wei |
| 2005/0149972 A1 | 7/2005 | Knudson |
| 2005/0155063 A1 | 7/2005 | Bayrakeri et al. |
| 2005/0262542 A1 | 11/2005 | DeWeese et al. |
| 2005/0283800 A1 | 12/2005 | Ellis et al. |
| 2005/0287948 A1 | 12/2005 | Hellwagner et al. |
| 2006/0004743 A1 | 1/2006 | Murao et al. |
| 2006/0059525 A1 | 3/2006 | Jerding et al. |
| 2006/0068818 A1* | 3/2006 | Leitersdorf ............ H04H 20/18 455/466 |
| 2006/0080707 A1 | 4/2006 | Laksono |
| 2006/0105793 A1 | 5/2006 | Gutowski et al. |
| 2006/0156336 A1 | 7/2006 | Knudson et al. |
| 2006/0195865 A1 | 8/2006 | Fablet |
| 2006/0200842 A1 | 9/2006 | Chapman et al. |
| 2006/0206470 A1 | 9/2006 | McIntyre |
| 2006/0206912 A1 | 9/2006 | Klarfeld et al. |
| 2006/0248572 A1 | 11/2006 | Kitsukama et al. |
| 2007/0064715 A1* | 3/2007 | Lloyd ................. H04L 12/2602 370/401 |
| 2007/0112761 A1 | 5/2007 | Xu et al. |
| 2007/0220016 A1 | 9/2007 | Estrada et al. |
| 2007/0271587 A1 | 11/2007 | Rowe |
| 2008/0037722 A1 | 2/2008 | Klassen |
| 2008/0060011 A1 | 3/2008 | Kelts |
| 2008/0071770 A1 | 3/2008 | Schloter et al. |
| 2008/0189740 A1 | 8/2008 | Carpenter et al. |
| 2008/0196070 A1 | 8/2008 | White et al. |
| 2008/0235725 A1 | 9/2008 | Hendricks |
| 2008/0276278 A1 | 11/2008 | Krieger et al. |
| 2008/0288644 A1 | 11/2008 | Gilfix et al. |
| 2008/0317233 A1 | 12/2008 | Rey et al. |
| 2009/0019485 A1 | 1/2009 | Ellis et al. |
| 2009/0024629 A1 | 1/2009 | Miyauchi |
| 2009/0094632 A1 | 4/2009 | Newnam et al. |
| 2009/0094651 A1* | 4/2009 | Damm ................. H04L 12/1868 725/93 |
| 2009/0164904 A1 | 6/2009 | Horowitz et al. |
| 2009/0222872 A1 | 9/2009 | Schlack |
| 2009/0228441 A1 | 9/2009 | Sandvik |
| 2009/0249427 A1 | 10/2009 | Dunnigan et al. |
| 2009/0271829 A1 | 10/2009 | Larsson et al. |
| 2009/0292548 A1 | 11/2009 | Van Court |
| 2010/0077057 A1 | 3/2010 | Godin et al. |
| 2010/0079670 A1 | 4/2010 | Frazier et al. |
| 2010/0175084 A1 | 7/2010 | Ellis et al. |
| 2010/0180300 A1 | 7/2010 | Carpenter et al. |
| 2010/0223640 A1 | 9/2010 | Reichardt et al. |
| 2010/0250190 A1 | 9/2010 | Zhang et al. |
| 2010/0251284 A1 | 9/2010 | Ellis et al. |
| 2011/0055282 A1 | 3/2011 | Hoving |
| 2011/0058101 A1 | 3/2011 | Earley et al. |
| 2011/0087348 A1 | 4/2011 | Wong |
| 2011/0093909 A1 | 4/2011 | Roberts et al. |
| 2011/0131204 A1 | 6/2011 | Bodin et al. |
| 2011/0209180 A1 | 8/2011 | Ellis et al. |
| 2011/0214143 A1 | 9/2011 | Rits et al. |
| 2011/0219419 A1 | 9/2011 | Reisman |
| 2011/0246695 A1 | 10/2011 | Mallinson |
| 2011/0247042 A1 | 10/2011 | Mallinson |
| 2012/0002111 A1* | 1/2012 | Sandoval ................ H04N 5/06 348/521 |
| 2012/0054811 A1 | 3/2012 | Spears |
| 2012/0117151 A1 | 5/2012 | Bill |
| 2012/0227073 A1 | 9/2012 | Hosein et al. |
| 2012/0233646 A1 | 9/2012 | Coniglio et al. |

(56) References Cited

U.S. PATENT DOCUMENTS

| | | | |
|---|---|---|---|
| 2012/0295686 A1* | 11/2012 | Lockton | H04L 65/4076 463/19 |
| 2012/0324002 A1 | 12/2012 | Chen | |
| 2012/0324495 A1 | 12/2012 | Matthews, III et al. | |
| 2012/0324518 A1 | 12/2012 | Thomas et al. | |
| 2013/0110769 A1 | 5/2013 | Ito | |
| 2013/0111514 A1 | 5/2013 | Slavin et al. | |
| 2013/0262997 A1 | 10/2013 | Markworth et al. | |
| 2013/0298038 A1 | 11/2013 | Spivack et al. | |
| 2013/0326570 A1 | 12/2013 | Cowper et al. | |
| 2013/0332839 A1 | 12/2013 | Frazier et al. | |
| 2013/0332852 A1 | 12/2013 | Castanho et al. | |
| 2013/0347018 A1 | 12/2013 | Limp et al. | |
| 2013/0347030 A1* | 12/2013 | Oh | H04N 21/478 725/32 |
| 2014/0006951 A1 | 1/2014 | Hunter | |
| 2014/0009680 A1 | 1/2014 | Moon et al. | |
| 2014/0032473 A1 | 1/2014 | Enoki et al. | |
| 2014/0089423 A1 | 3/2014 | Jackels | |
| 2014/0149918 A1 | 5/2014 | Asokan et al. | |
| 2014/0150022 A1 | 5/2014 | Oh et al. | |
| 2014/0325359 A1 | 10/2014 | Vehovsky et al. | |
| 2014/0365302 A1 | 12/2014 | Walker | |
| 2015/0026743 A1* | 1/2015 | Kim | H04L 65/4076 725/109 |
| 2015/0263923 A1* | 9/2015 | Kruglick | H04L 43/0852 718/1 |

FOREIGN PATENT DOCUMENTS

| | | |
|---|---|---|
| EP | 1058999 A1 | 12/2000 |
| EP | 1080582 A1 | 3/2001 |
| GB | 2323489 A | 9/1998 |
| WO | 9963757 A1 | 12/1999 |
| WO | 0011869 A1 | 3/2000 |
| WO | 0033576 A1 | 6/2000 |
| WO | 0110115 A1 | 2/2001 |
| WO | 0182613 A1 | 11/2001 |
| WO | 02063426 A2 | 8/2002 |
| WO | 02063471 A2 | 8/2002 |
| WO | 02063851 A2 | 8/2002 |
| WO | 02063878 A2 | 8/2002 |
| WO | 03009126 A1 | 1/2003 |
| WO | 03/026275 A2 | 3/2003 |
| WO | 2011/053271 A1 | 5/2011 |
| WO | 2012/094105 A1 | 7/2012 |
| WO | 2012/154541 A1 | 11/2012 |

OTHER PUBLICATIONS

European Extended Search Report—EP 13192112.4—Dated May 11, 2015.

Fernando Pereira, "The MPEG-4 Book", Prentice Hall, Jul. 10, 2002.

Michael Adams, "Open Cable Architecture", Cisco Press, Dec. 3, 1999.

Andreas Kraft and Klaus Hofrichter, "An Approach for Script-Based Broadcast Application Production", Springer-Verlag Brling Heidelberg, pp. 74-82, 1999.

Mark Riehl, "XML and Perl", Sams, Oct. 16, 2002.

MetaTV, Inc., PCT/US02/29917 filed Sep. 19, 2002, International Search Report dated Apr. 14, 2003; ISA/US; 6 pages.

Sylvain Devillers, "Bitstream Syntax Definition Language: an Input to MPEG-21 Content Representation", Mar. 2001, ISO, ISO/IEC JTC1/SC29/WG11 MPEG01/M7053.

Shim, et al., "A SMIL Based Graphical Interface for Interactive TV", Internet Tech. Laboratory Dept. of Comp. Engineering, San Jose State University, pp. 257-266, 2003.

Yoon, et al., "Video Gadget: MPET-7 Based Audio-Visual Content Indexing and Browsing Engine", LG Electronics Institute of Technology, 2001, pp. 59-68.

Watchwith webpage; http://www.watchwith.com/content_owners/watchwith_plalform_components.jsp (last visited Mar. 12, 2013).

Matt Duffy; TVplus App reveals content click-through rates north of 10% across sync enabled programming; http://www.tvplus.com/blog/TVplus-App-reveals-content-click-through-rates-north-of-10-Percent-across-sync-enabled-programming (retrieved from the Wayback Machine on Mar. 12, 2013).

"In Time for Academy Awards Telecast, Companion TV App Umami Debuts First Real-Time Sharing of a TV Program's Images"; Umami News; http:www.umami.tv/2012-02-23.html (retrieved from the Wayback Machine on Mar. 12, 2013).

Boronat F et al: "Multimedia group and inter-stream synchronization techniques: A comparative study", Information Systems. Pergamon Press. Oxford. GB. vol. 34. No. 1. Mar. 1, 2009. pp. 108-131. XP025644936.

Extended European Search Report—EP14159227.9—Mailing Date: Sep. 3, 2014.

Response to European Office Action—European Appl. 13192112.4—submitted Dec. 9, 2015.

CA Office Action—CA App 2,685,833—Mailed Jan. 27, 2016.

European Office Action—EP App 14159227.9—Dated Jul. 12, 2016.

Agnieszka Zagozdzinnska et al. "TRIDAQ Systems in HEP Experiments at LHC Accelerator" Kwartalnik Elektroniki I Telekomunikacji, vol. 59, No. 4, Jan. 1, 2013.

CA Response to Office Action—CA Appl. 2,685,833—Submitted Jul. 17, 2015.

* cited by examiner

SYNCHRONIZING MULTIPLE TRANSMISSIONS OF CONTENT

BACKGROUND

Television viewing is no longer the static, isolated, or passive pastime that it used to be. Today, viewers have the option of using a computing device, such as a tablet computer or smartphone, as a second screen to view a webpage related to a show they are watching, thereby keeping viewers engaged in a particular program. However, there is a demand for taking second screen experiences further. Specifically, there is a demand for supplemental content (e.g., second screen content) that is synchronized with the primary content users are watching. While users want synchronization between their supplemental content and other programs, they also want and rely on fast network speeds. Thus, systems and methods for providing synchronized supplemental content with minimal impact on network bandwidth and other benefits are desired.

SUMMARY

Some or all of the various features described herein may facilitate synchronization of supplemental content (e.g., second screen content) displayed on a second user device (e.g., a second screen device such as a tablet computer, smartphone, laptop, etc.) with primary content displayed on a first user device (e.g., a first screen device such as a television or video display) thereby providing a desirable second screen experience. Some aspects described below allow for synchronization of supplemental content with linear or time shifted primary content while minimizing an impact on network bandwidth.

In accordance with some aspects of the disclosure, a plurality of interfaces (e.g., gateways, user devices, set top boxes, etc.) may receive triggers from a trigger source for supplemental content (e.g., second screen content) to be displayed on second screen devices in synchronicity with primary content. A subset of those interfaces may be selected to represent the plurality, and the subset may report back trigger receipt information to the trigger source, to allow the source to adjust its timing of future triggers for the plurality of interfaces. Because a subset of the interfaces (which may be a relatively small amount of interfaces in comparison to the total number of interfaces) are used to report the triggers, instead of all of the interfaces, the impact on the upstream bandwidth of a service provider's network may be minimized.

In an illustrative embodiment, the disclosure teaches grouping or categorizing interfaces into different zones or groups, and teaches that the interfaces in a common zone or group are expected to receive the same primary content at approximately the same time. In contrast, different zones may receive similar primary content (e.g., a television program), but the primary content may include different advertisements or may be time shifted differently (e.g., have different delays). In each zone, a subset of interfaces are expected to detect and report triggers embedded within or otherwise transmitted with the primary content. The subset of interfaces may vary. In some embodiments, the interfaces themselves or an associated computing device may compute an algorithm to determine whether they should report the trigger. An algorithm may be based on statistical information received from a service provider or some other administrator. The statistical information may be specific to each zone (or group) because, for example, it may be expected that users in some zones are more likely to view certain content than users in another zone. An algorithm may take into account the channel for delivering the primary content, time of day, and other factors when determining whether the interface (or an application associated with the interface) should report a trigger.

In another aspect, and in particular to further reduce network traffic, multipliers may be sent at more frequent intervals than the statistical information, which may include a heavier payload than the multiplier. A multiplier may be a factor used to adjust the subset of interfaces reporting triggers. Regardless of the method for determining whether a trigger should be reported, when the trigger is reported, a trigger detection signal may be sent upstream on the same lines or channel that the primary content is received on. The trigger detection signal may eventually reach one or more servers dedicated for receiving and processing such signals. The server(s) may then push synchronization signals to certain second screen devices that it knows or believes are displaying second screen content associated with the primary content from which the trigger was detected. The server may transmit synchronization signals to second screen devices in response to the trigger detection signals. The second screen devices may then use the synchronization signals to synchronize second screen content, which may be received from another source, e.g., another network or server, or already downloaded on the second screen device. Additionally, aspects of the present disclosure teach computing devices, having a processor and memory storing computer-executable instructions, and other apparatuses to perform the above steps and other steps for improving a second screen experience.

Other details and features will also be described in the sections that follow. This summary is not intended to identify critical or essential features of the inventions claimed herein, but instead merely summarizes certain features and variations thereof.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

By way of introduction, the various features described herein may allow a user to consume primary content (e.g., watch a television program) on a first device (e.g., a television) and second screen content, which is synchronized with the primary content, on a second device (e.g., a smartphone, tablet, laptop, etc.). In one example, an interface (e.g., a set top box) associated with the first device may determine whether it should report a trigger detected within the primary content. As a result, a sample of interfaces may report detected triggers instead of all interfaces thereby minimizing the impact of reporting triggers on the upstream bandwidth. This determination may be based on statistical information, a multiplier, and/or other data received from a service provider or other administrator. The system may monitor and update this information so that the reporting of the triggers may be further optimized. Based on detection signals received from the sample of interfaces, synchronization signals may be generated and transmitted (e.g., pushed) to second screen devices so that the second screen devices can synchronize second screen content with the primary content.

Figure 1:
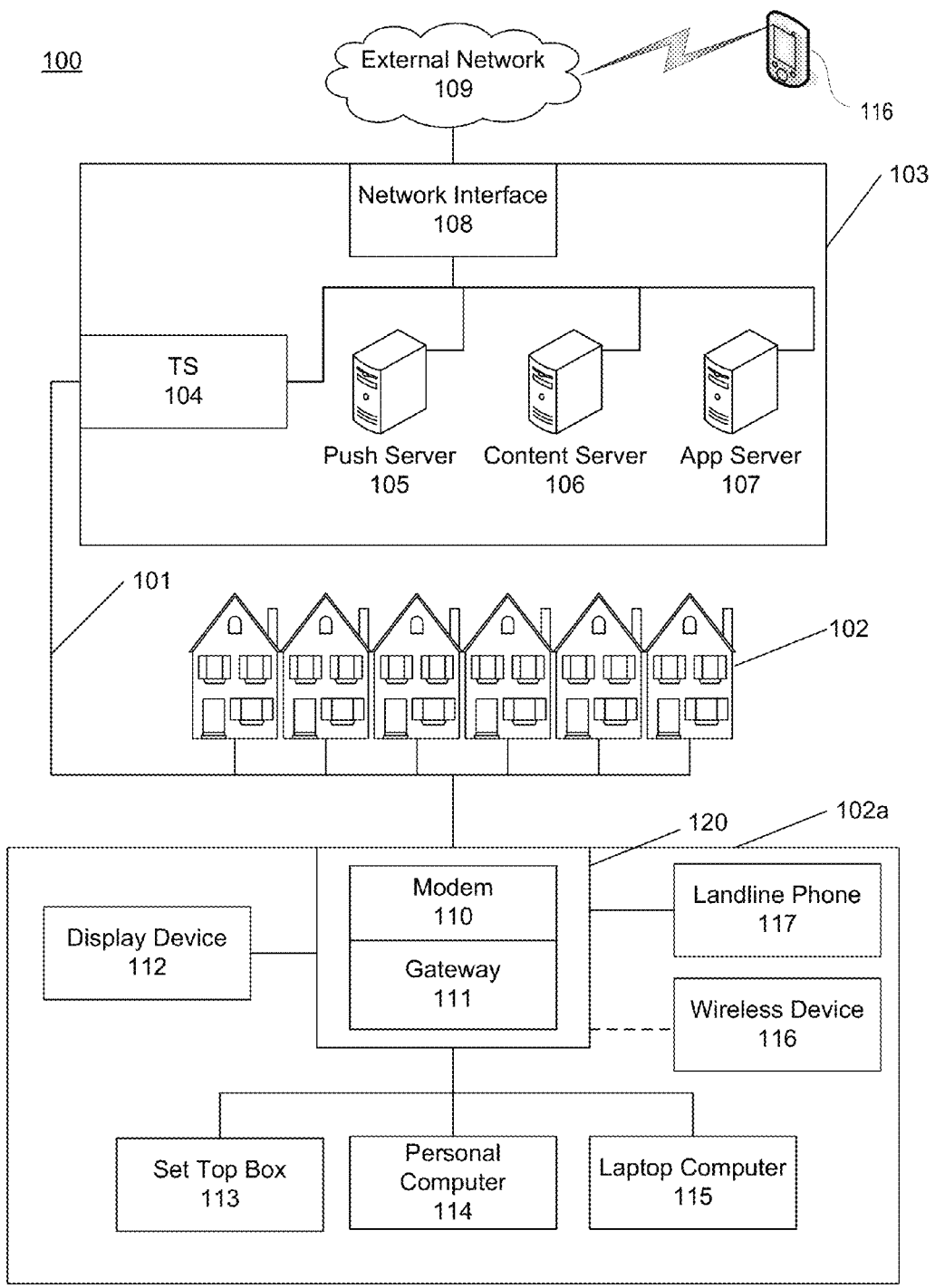
FIG. 1 illustrates an example communication network on which various features described herein may be used.

FIG. 1 illustrates an example communication network 100 on which many of the various features described herein, such as the requesting and retrieval of primary content and second screen content may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones. For example, the network interface 108 may communicate with a wireless device 116 via the external network 109 so that the wireless device 116 may receive supplemental content from the local office 103 or other computing devices connected to the external network 109.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data, such as information for identifying a user or second screen device.

An example premises 102a, such as a home, may include an interface 120. The interface 120 may include computer-executable instructions (e.g., an application) for performing one or more aspects of the disclosure, such as detecting triggers, determining whether to report triggers, and/or generating detection signals to report triggers. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.16), analog twisted pair interfaces, Bluetooth interfaces, and others.

Figure 2:
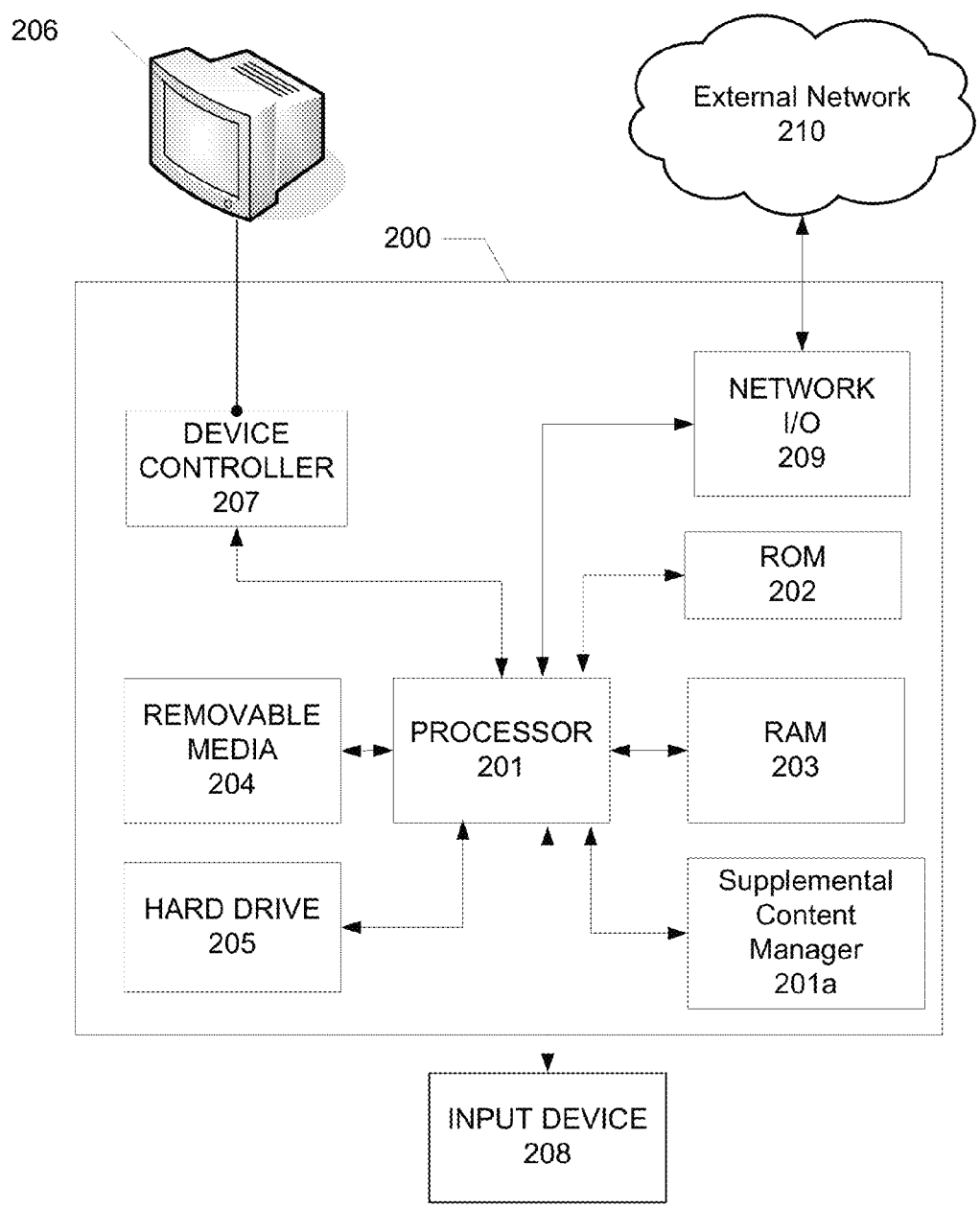
FIG. 2 illustrates an example computing device and software configuration that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network.

The FIG. 2 example is a hardware configuration. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device). Additionally, the computing device 200 may include a supplemental content manager 201a, which can perform the various methods for realizing synchronization of the second screen content with the primary content described herein as a replacement for, or augment to, any other processor 201 that the computing device 200 may include. That is, the supplemental content manager 201a may include a separate processor and/or set of computer-executable instructions stored on a computer-readable medium that, when executed by a processor, cause the processor (or the computing device 200 as a whole) to perform the various methods of the present disclosure, such as processing detection signals, monitoring detection signals, generating sampling information and multipliers, and generating synchronization signals. The supplemental content manager 201a may also include secure memory (not shown), which can store the various sampling information, multipliers, algorithms, and zone information described herein. The secure memory can be any desired type of memory, and can have enhanced security features to help restrict access (e.g., can only be accessed by the supplemental content manager 201a, can be internal to the supplemental content manager 201a, etc.). Where the supplemental content manager 201a includes a separate set of computer-executable instructions, these instructions may be secured such that only authorized users may be allowed to modify, augment, or delete them.

In some embodiments, the supplemental content manager 201a may be implemented as an application specific integrated circuit (ASIC). That is, the supplemental content manager 201a may be a chip designed specifically for performing the various processes described herein. Further, the ASIC may be implemented within or in communication with various computing devices provided herein.

One or more aspects of the disclosure may be embodied in computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
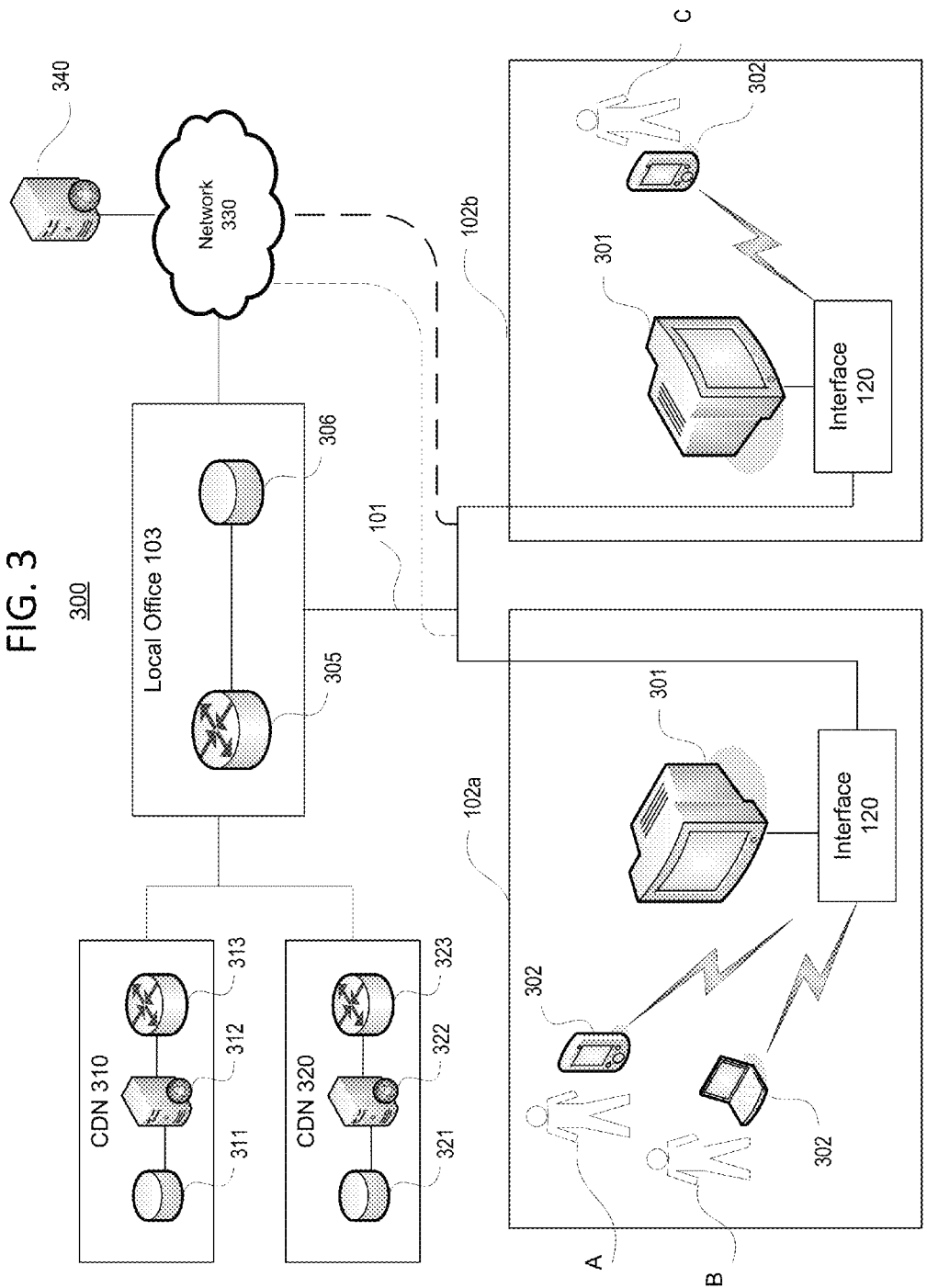
FIG. 3 illustrates a system architecture according to one or more illustrative aspects described herein.

FIG. 3 is a diagram showing an example system architecture 300 on which various features described herein may be performed. The system 300 of FIG. 3 depicts a local office 103, a first premises 102a, a second premises 102b, one or more content distribution networks (CDN) 310 and 320, a network 330, and a second screen experience management computing device (e.g., a server) 340. As shown in FIG. 1, the local office 103 may connect to the first premises 102a and second premises 102b via links 101. The first premises 102a may include an interface 120 (e.g., a set top box), a first screen device 301 (e.g., a television, a monitor, a projector, etc.), and one or more second screen devices 302 (e.g., a smartphone, tablet, laptop, etc.). As shown in FIG. 3, multiple users A and B may be located at the first premises 102a and each user may operate a second screen device 302 while consuming content via the first screen device 301. Meanwhile, the second premises 102b may include an interface 120, a first screen device 301, and a second screen device 302 used by a user C. Content, such as video content, may be transmitted from the local office 103 to the interfaces 120 of the first and second premises 102a-b, and presented through the first screen devices 301. Thus, users A and B may consume content (e.g., view a stream of a video program that is multicast according to a schedule, or transmitted on demand, or playing back content that is locally recorded at the device 301 or an associated device such as at a DVR) at the premises 102a and user C may consume content at the premises 102b. Notably, while consuming content, each user may operate a respective second screen device 302 to consume second screen content related to the primary content presented on the first device 301 at their premises 102. For example, user A may operate a second screen device 302, such as a smartphone, to consume second screen content, such as a poll through which user A may vote for a contestant shown in the primary content presented on the first screen device 301. The second screen content may be any data that provides information or content to supplement primary content, which may be the video content (e.g., linear television program, on-demand movie, etc.) presented on a first screen device 301. For example, second screen content may include a link to a webpage of a product shown in an advertisement of the primary content, a video clip with bonus features, text and/or images with information about the content itself or about individuals or items shown in the primary content, advertisements, coupons, questions pertaining to the primary content, etc. The various second screen content may be generated from ordinary everyday consumers of the primary content, as well as from formal primary content sources. The appearance of the second screen content may be generated by the second screen device 302 using software that is previously stored, or it may be dynamically retrieved or received when it is needed, and the timing of when the second screen content appears (e.g., when a particular Internet link should appear, or when a particular image should be displayed) may be based on triggers or signals that are received along with the primary content stream.

Referring to FIG. 3, users (e.g., people) may consume content at a premises 102a (e.g., a home, business, etc.). Consuming content may include, for example, watching and/or listening to a television program or internet video on a first screen device 301 (e.g., a television, computer monitor, projector, etc.). The first screen device 301 may receive the content from the interface 120, which is connected to the local office 103 and configured to accept the primary content. FIG. 3 also illustrates some examples of second screen devices 302, namely a smartphone and a laptop computer. Each second screen device 302 may be configured to store and/or execute a second screen experience application (e.g., a computer program) through which a user may select and consume second screen content. The second screen application may be downloaded from the local office 103 or another computing device 200 on the network 330, or retrieved from a computer readable medium (e.g., compact disc (CD), flash drive, etc.). The second screen application may also be a web browser for navigating to a website that provides the second screen experience described herein. Although FIG. 3 shows some example second screen devices 302, many other devices may be used as second screen devices 302. Indeed, even another television, similar in configuration to a first screen device 301, may be used as the second screen device 302. The second screen device 302 may also be a specially designed device (e.g., an enhanced television remote) for specific use in the embodiments disclosed herein.

Further, each of the second screen devices 302 may be configured to bi-directionally communicate via a wired and/or wireless connection with the second screen experience management computing device 340 via the network 330. Specifically, the second screen devices 302 may be configured to access the network 330 (e.g., the Internet) to obtain second screen content and to transmit/receive signals via the network 330 to/from the second screen experience management computing device 340. For example, a second screen device 302 may transmit information, such as requests for second screen content, through a wired connection, including the links 101 through which the primary content is supplied to a first screen device 301, to the local office 103 which then routes the transmission to the network 330 so that it may eventually reach the second screen experience management computing device 340. That is, the second screen device 302 may connect to the interface 120 and communicate with the second screen experience management computing device 340 over the links 101 used to transmit the primary content downstream. Alternatively, a second screen device 302 may wirelessly communicate via, for example, a WiFi connection and/or cellular backhaul, to connect to the network 330 (e.g., the Internet) and ultimately to the second screen experience management computing device 340. Accordingly, although not shown, the network 330 may include cell towers and/or wireless routers for communicating with the second screen devices 302.

Although FIG. 3 depicts the second screen experience management computing device 340 as being separate from the local office 103, in some embodiments, the second screen experience management computing device 340 may be located at the local office 103. In such embodiments, the second screen devices 302 may still access the second screen experience management computing device 340 through the network 330. Further, even though the second screen experience management computing device 340 is shown as a single element, in some embodiments, it may include a number of computing devices 200, which may include the supplemental content manager 201a.

Still referring to FIG. 3, the local office 103 may be a computing device, a termination system, node, etc. within the system architecture 300. The local office 103 may include a router 305, and a database 306 for storing user information (e.g., user profiles), primary content, second screen content, and/or computer-executable instructions for inserting triggers, transmitting multipliers, or any of the steps described herein. The router 305 of the local office 103 may forward requests for content from users and/or user devices (e.g., first screen devices 301, second screen devices 302, etc.) to one or more CDNs 310 and 320 and/or the second screen experience management computing device 340 that may supply the requested content and/or synchronization signals. Each of the CDNs 310 and 320 may include one or more routers 311 and 321, whose purpose is to receive requests from users (e.g., via their local offices) and route them to servers within its network that may store the requested content and be able to supply it in response to the request. A CDN 310 for a given piece of content might have a hierarchy of one primary source, and a plurality of lower-level servers that can store (e.g., cache) the content and respond to requests. The lower-level servers that ultimately service the request may be referred to as edge servers, such as one or more edge servers 312 and 322. The various servers may include one or more content databases 313 and 323, which store content that the respective CDN 310 and 320 manages. In some embodiments, the CDNs 310 and 320 may provide the same or similar content. In other embodiments, the CDNs 310 and 320 may offer different content from one another. Also, the CDNs 310 and 320 may be maintained/operated by the same or different content providers. Although only two CDNs 310 and 320 are shown, many CDNs may be included in the system architecture 300 of FIG. 3.

Figure 4:
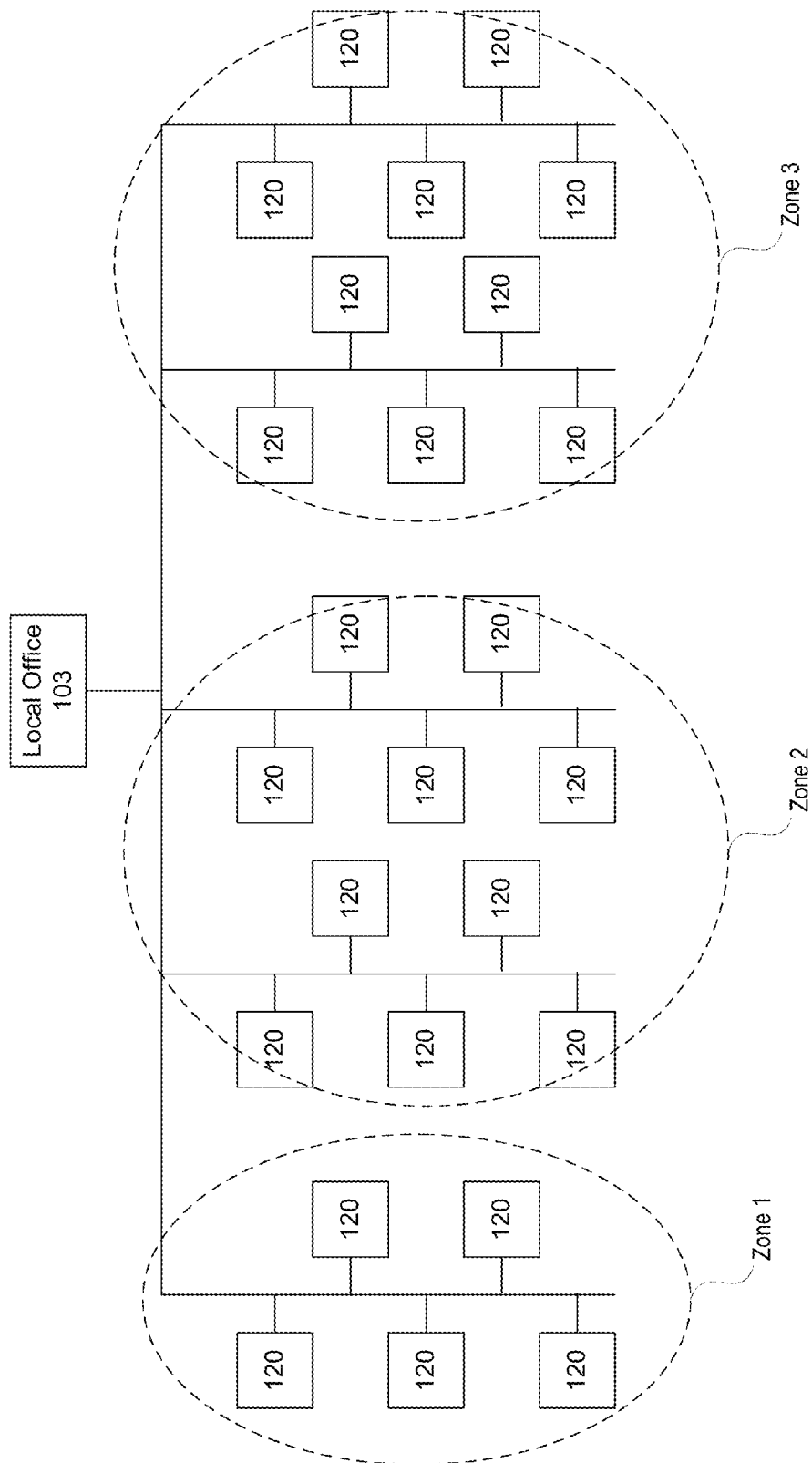
FIG. 4 illustrates a diagram illustrating an example embodiment of another aspect of the present disclosure.

FIG. 4 is a diagram illustrating an aspect of the present disclosure. Specifically, FIG. 4 illustrates that a network, such as a service provider network including a plurality of interfaces 120 located at various premises 102, may be separated into a plurality of groups or zones (e.g., Zone 1, Zone 2, Zone 3, etc.). Each group or zone may include a plurality of interfaces 120 (e.g., set top boxes). The amount of interfaces 120 in each group or zone may be different. In some examples, the zones may cover a specific geographical region. For example, the zones may correspond to zip codes or area codes. In other examples, each zone may include multiple zip codes or area codes. Vice versa, multiple zones may make up a single zip code or area code. The zone groupings of interfaces may be done geographically, to group together interfaces that are in the same neighborhood, or served by the same local office 103 or trunk line. The zone groupings may also be determined based on signal propagation delay. For example, all of the interfaces that experience a 1500 ms delay in receiving a downstream signal from the server 340 may be grouped in one group (regardless of geography), and all of the interfaces that experience a 2500 ms delay may be grouped in another group.

The zones may also be defined based on the similarity in the content they receive. For example, members of each zone may receive the same primary content, including identical advertisements, that is received by other members in the zone. In other words, the local office 103 may deliver the same primary content to each of the interfaces 120 in the same zone so that users of the interfaces 120 are exposed to the same advertisements. Interfaces 120 in different zones may receive different content. In particular, the advertisements delivered to the interfaces 120 of different zones may be different. For example, all of the interfaces 120 in Zone 1 may receive a television program with an advertisement for a car during a commercial break, while all of the interfaces 120 in Zone 2 may receive the same television program but the advertisement at the same commercial break may be for a clothing store. In this example, the television program is the same, but the television programs may also be different. Further, the frequencies of the channels used to transmit the primary content may vary among the different zones. For example, in Zone 1, the primary content provided by NBC may be transmitted at a first frequency (e.g., 552 MHz), while in Zone 2, the primary content provided by NBC may be transmitted at a second frequency (e.g., 750 MHz). Similarly, the logical channels (e.g., channel 25) used to transmit the primary content may vary among the different zones. For example, in Zone 1, the primary content provided by NBC may be on channel 24, while in Zone 2, the primary content provided by NBC may be on channel 25.

It should be understood that interfaces 120 in different zones may also receive the same primary content including the same advertisements; however this might not always be the case. Further, while the content delivered to each of the interfaces 120 in the same zone may be the same, it should be understood that the precise time at which the content arrives at the interfaces 120 in the same zone may be different. For example, there may be delays in transmitting the content such that one interface in Zone 1 receives the content at a first time, whereas another interface in Zone 1 receives the same content at a second time a few seconds later.

Figure 5:
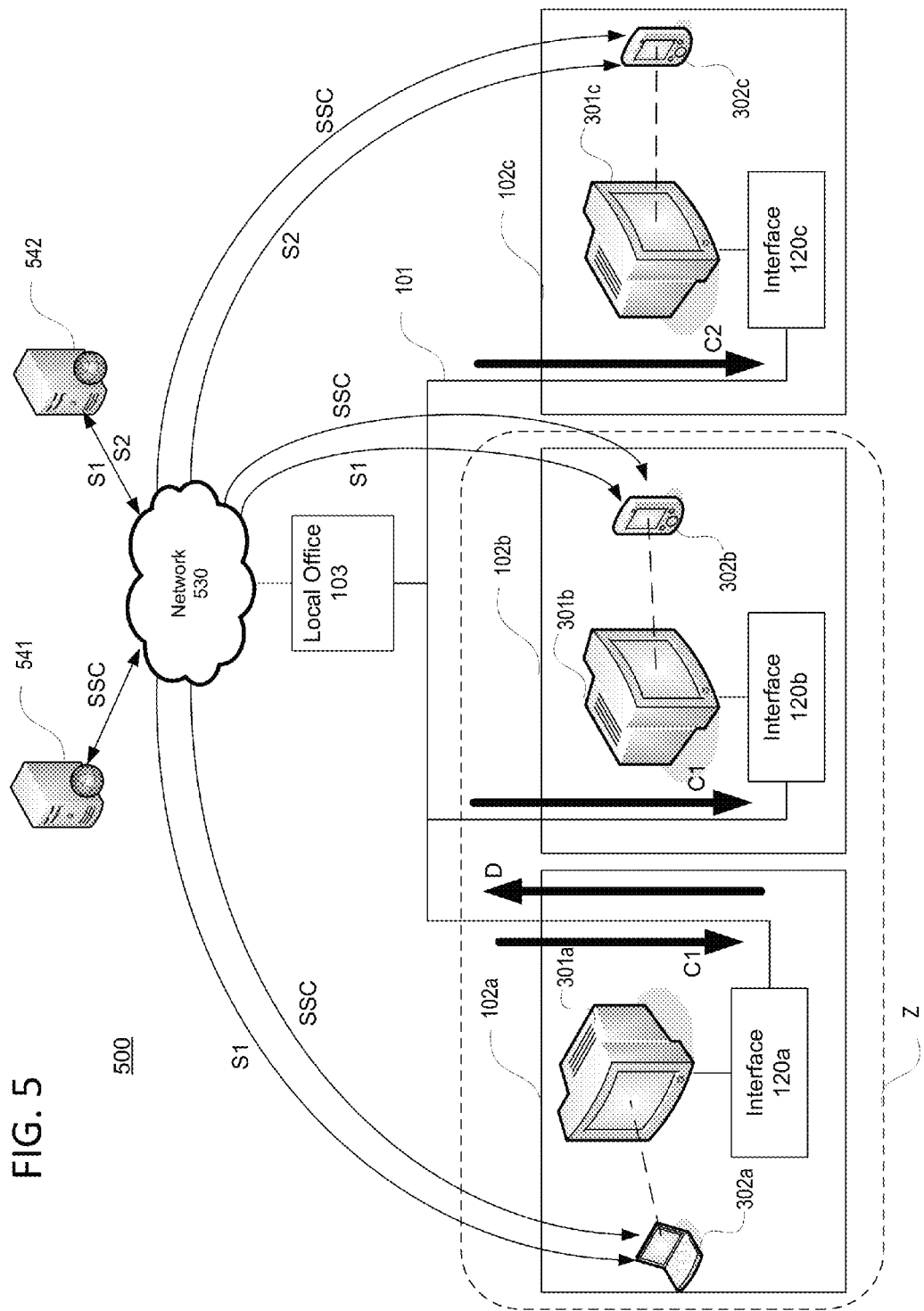
FIG. 5 illustrates a system architecture according to one or more illustrative aspects described herein.

FIG. 5 is a high-level diagram showing an example system architecture 500 on which various features described herein may be performed. The system 500 may include a number of premises 102a, 102b, 102c, a local office 103, a network 530, a second screen content server 541, and a synchronization manager 542. At each of the premises 102 there may be an interface 120a, 120b, 120c, a first screen device 301a, 301b, 301c, and a second screen device 302a, 302b, 302c. As shown in FIG. 5, the premises 102a and 102b may belong to the same zone Z. Accordingly, the interfaces 120a and 120b may receive the same primary content C1. Meanwhile, premises 102c, which is not within the same zone Z, may receive different primary content C2. Herein, the primary content C1 and primary content C2 may refer to the content shown on the first screen device 301, and may include, for example, both television programs and commercials. It should also be understood that the primary content C1 and primary content C2 may include similar content, but may be different in terms of their advertisement content or may be time shifted from one another. For example, the primary content C1 and primary content C2 may include the same television program at the same time on the same television channel, but have different advertisements during the commercial breaks. As another example, the primary content C1 may include a live television show (e.g., a football game) while the primary content C2 may include the same live television show but shifted in time so that there is a delay between when a user interface 120a receives the primary content C1 and when a user interface 120c receives the primary content C2.

As mentioned, FIG. 5 shows the same content C1 being received by interfaces 120a and 120b. However, this is just one example scenario intended to illustrate that two interfaces (e.g., 120a and 120b) within the same zone Z may receive the same content at approximately the same time if they are tuned to the same channel. It should be understood that the interfaces 120a and 120b may still receive different content (e.g., different television shows) if they are tuned to different channels. In other words, each interface 120 may tune to whatever particular piece of content is desired from among the entire collection of primary content C1 or C2 that it receives.

The primary content C1 and C2 (including, e.g., programming content and advertising content) may include triggers embedded within the content, or sent contemporaneously with the primary content, such as in a different logical data stream. The same content may have the same triggers. For example, primary content C1 delivered to interface 102a may include the same triggers as the primary content C1 delivered to the interface 102b. Meanwhile, the primary content C2 may have different triggers than the primary content C1. For example, even where the primary content C1 and primary content C2 are similar (e.g., where C1 and C2 both include the same television show), the primary content C1 may have different commercials than the primary content C2, and therefore, the triggers in the different commercials may be different. These triggers may be embedded by content creators (not shown) at the time the primary content C1, C2 is created or by the local office 103 (or other content providers) before delivering the primary content to the appropriate interfaces 120. The triggers may be embedded within, or synchronized with, the content C1, C2 at constant or variable intervals. For example, the content C1, C2 may include a different trigger every five minutes. The triggers may include information identifying the associated primary content C1, C2 or any other information, such as information for supplementing the primary content C1, C2. The triggers also may include a unique or random identifier that may allow the trigger to be identified. Various formats for the triggers may be used. For example, the triggers may use the Enhanced TV Binary Interchange Format (EBIF) or comply with standards for digital program insertion of the Society of Cable Telecommunications Engineers (SCTE), such as SCTE 35, and may be sent in a data stream in synchronization with the primary content C1, C2. Alternatively, the trigger may be a vertical blanking interval (VBI) trigger embedded within the video stream of the primary content C1, C2 (e.g., using closed captioning fields) . Further, in some embodiments, watermarks in the video and/or audio streams of the primary content C1, C2 may be used as triggers.

As shown in FIG. 5, the interface 120a may transmit a detection signal D back upstream after detecting a trigger in the primary content C1. Although FIG. 5 shows the interface 120a receiving triggers and sending the detection signal D, another computing device associated with (or coupled to) the interface 120a may perform these functions. For example, the interface 120a might receive the triggers and another computing device associated with the interface 120a may generate and send the detection signal D. A detection signal D may include information identifying a timing of when an interface 120 actually received an associated trigger, as well as, information identifying the portion of the primary content that was being consumed at the time the trigger was received and/or a trigger identifier. Notably, the interface 120b, which is in the same zone Z and receives the same primary content C1 as the interface 120a, does not transmit a detection signal back upstream. This is because in the example of FIG. 5, the interface 120b was not selected to report the trigger. In other examples, the interface 120b may send the detection signal to report the trigger and the interface 120a might not. Still in other examples, both interfaces 120a and 120b may send detection signals to report the triggers. Since interface 120a might not know whether interface 120b will send the detection signal, and vice versa, both interfaces 120a and 120b might independently determine that they should send the detection signal to be sure that synchronization will be maintained. On the contrary, neither interface 120a and 120b may send the detection signal, and instead, synchronization of the corresponding second screen devices 302a and 302b might depend on a detection signal sent by another interface 120 (not shown in FIG. 5) within the same zone Z. The determination of whether an interface 120 should report the trigger may be made on a trigger-by-trigger basis. That is, for every trigger received, each interface 120 may determine whether it should transmit a detection signal to report the trigger.

Further, although the interface 120b in the example of FIG. 5 does not report the trigger, the second screen device 302b may still be synchronized with the primary content C1 streamed on the first screen device 301b because the second screen device 302b may benefit from the detection signal sent by the interface 120a as described in more detail below. As long as there is another interface 120 within the same zone sending a detection signal in response to the primary content presented on the first screen device 301b, the second screen device 302b may be synchronized with the first screen device 301b without the interface 120b having to send a detection signal. In light of the above, one of ordinary skill in the art should realize the advantages this system may offer in terms of bandwidth. Since both of the interfaces 120a and 120b are not sending detection signals upstream, the upstream bandwidth over the links 101 connecting the local office 103 to the interfaces 120 may be conserved.

Additionally, one should understand that the interface 120c which is in a different zone from interface 120a might not benefit from the detection signal sent by the interface 120a. Because the primary content C2 may be different than the primary content C1 (e.g., primary content C2 may include different advertisements inserted into the programming content), the detection signal sent in response to the trigger in the content C1 might not help to synchronize second screen content on the second screen device 302c with the primary content on the first screen device 301c.

Still referring to FIG. 5, the detection signal D may be transmitted to the synchronization manager 542. The synchronization manager 542 may be configured to receive detection signals D and generate and transmit synchronization signals S1, S2 to second screen devices 302. Each synchronization signal S1, S2 may include a number of signals transmitted in series in response to a single detection signal D. In some embodiments, the synchronization manager 542 may identify detection signals D and determine what primary content and/or what triggers are associated with the detection signals D. The synchronization manager 542 may then generate a specific synchronization signal S1 based on this determination so that second screen devices 302 can synchronize second screen content SSC with the primary content C1. For example, where the detection signal D is sent in response to a trigger embedded in an advertisement for a car, the synchronization manager 542 may generate and transmit a synchronization signal S1 to second screen devices 302a and 302b indicating that the interfaces 120a and 120b have recently outputted the advertisement for a car. As a result, the second screen devices 302a and 302b may synchronize second screen content SSC to display a portion of the second screen content SSC related to the car in synchronization with the primary content C1 which recently included the advertisement for the car. The synchronization signal S1 may include information identifying the primary content and/or information indicating a timing of primary content being presented, a timing of supplemental content to be presented, a portion of primary content being presented, and/or a portion of supplemental content to be presented. Further, the synchronization signal S1 may include a number of signals transmitted in series in response to a single detection signal D.

The synchronization signal S1 may be a multicast signal pushed to a plurality of second screen devices 302 listening for multicast signals. The second screen devices 302 may then determine whether the synchronization signal S1 is related to the second screen content SSC it is presenting. For example, where the interface 120a is streaming one television show and the interface 120b is streaming another television show, the synchronization signal S1, multicasted to both the second screen device 302a and second screen device 302b, might only be received and used by the second screen device 302a because the detection signal D was sent from interface 120a associated with the second screen device 302a. In this example, the second screen device 302b might ignore the multicasted synchronization signal S1 because its associated interface 120b is not streaming the same television show. Where the synchronization signal S1 is a multicast signal, it may be sent to all second screen devices 302 in the same zone, or all second screen devices 302 regardless of zones (the latter case is not depicted in FIG. 5).

Alternatively, the synchronization signal S1 may include a plurality of signals that are selectively pushed to particular second screen devices 302 that have identified themselves as presenting (or desiring to present) related second screen content SSC. For instance, each time a second screen device 302 is directed to present different second screen content SSC, the second screen device 302 may send a signal to the synchronization manager 542 informing the synchronization manager 542 of the second screen content that it is presenting. As a result, the synchronization manager 542 may learn which second screen devices 302 should be sent synchronization signals related to such second screen content SSC.

The synchronization signal S2 may be different from the synchronization signal S1 because the second screen device 302c is associated with the interface 120c in a different zone than the zone Z which includes interfaces 120a and 120b. The synchronization signal S1 might not be useful to the second screen device 302c because the content C2 received by the interface 120c is not necessarily the same as the content C1. The synchronization signal S2 may be transmitted by the same synchronization manager 542 that transmits synchronization signal S1. However, the synchronization manager 542 may transmit the synchronization signal S2 in response to a different detection signal (not shown), than detection signal D, that is transmitted to the synchronization manager 542 by another interface 120 (not shown) in the same zone as the interface 120c. Also, although not shown in FIG. 5, the synchronization signal S2 may be sent to other interfaces 120 within the same zone as interface 120c.

Further, FIG. 5 illustrates the paths of transmission of second screen content SSC. Although FIG. 5 illustrates that second screen devices 302 receive second screen content SSC from the second screen content server 541 via the network 530, in other examples, the second screen content SSC may be received from a plurality of sources via a plurality of other networks. The second screen content server 541 may be configured to transmit the second screen content SSC to one or more of the second screen devices 302 via the network 530, which may include a cellular backhaul, the Internet, and/or additional local and wide area networks. The second screen content SSC may be multicast or unicast to the second screen devices 302. In some cases, the second screen devices 302 may first transmit a request (not shown) to the second screen content server 541 for specific second screen content SSC. For example, when a user via an application on a second screen device 302 directs a second screen device 302 to present specific second screen content SSC, the second screen device 302 may send a request identifying the second screen content desired to the second screen content server 541. In response to this request, the second screen content server 541 may transmit the second screen content SSC back to the second screen device 302. In some embodiments, the request for second screen content may simply refer to the primary content for which second screen content is desired and the second screen content server 541 may detect what second screen content SSC to supply in response. As shown in FIG. 5, the same second screen content SSC may be sent to second screen devices 302 in different zones. That is, there may be a single file of second screen content associated with a particular piece of primary content, and therefore, the job of synchronizing that second screen content may be left up to the second screen devices 302.

Once a second screen device 302 receives second screen content SSC and a synchronization signal S1, S2, the second screen device 302 may perform synchronization. Specifically, the second screen device 302 may use a received synchronization signal S1, S2 to determine which segment or time point in the second screen content SSC to present. For example, if there are 30 segments of the second screen content SSC and the synchronization signal S1 indicates that the $20^{th}$ segment should be presented, the second screen device 302 will analyze the second screen content SSC to present the $20^{th}$ segment. As a result, the second screen content SSC presented on the second screen device 302 may be synchronized with the primary content C1, C2 on the associated first screen device 301. This synchronization is illustrated by the dashed lines connecting the second screen devices 302 with their associated first screen devices 301.

While FIG. 5 shows the second screen content SSC and the synchronization signals S1, S2 as separate signals from each other, in some embodiments, they may be combined. In other words, instead of sending both a synchronization signal S1 and second screen content SSC, a combined signal may be sent that includes the second screen content SSC time shifted according to the synchronization signal S1. For example, in response to the detection signal D sent by the interface 120a, the particular segment of second screen content SSC corresponding to the primary content C1 presented on the first screen device 301a may be transmitted down to the second screen device 302a. In this manner, the synchronization may be considered to have occurred in the cloud, and the second screen device 302 may present the synchronized second screen content without having to perform the synchronization itself. Further, it should be understood that when the second screen content SSC and synchronization signals S1, S2 are separate, the order in which they are received by the second screen device 302 may vary. That is, in some cases a second screen device may receive the second screen content SSC before the synchronization, and in other cases it may be reversed. In the reverse scenario, the second screen device 302 may buffer the synchronization signal until the second screen content SSC is acquired and then use the synchronization signal to perform synchronization.

In accordance with the above, second screen devices 302 may synchronize second screen content SSC with linear primary content based on synchronization signals S1, S2 that are generated in response to detection signals D sent from other premises 102. In comparison, second screen devices 302 attempting to synchronize second screen content SSC with time-shifted primary content (e.g., video on-demand content) might only use synchronization signals S1, S2 that are generated in response to detection signals sent from an interface 120 at the same premises 102. Alternatively, second screen devices 302 may synchronize second screen content SSC with time-shifted primary content using audio recognition processes to analyze the audio of the time-shifted primary content or using triggers received, via a wired or wireless connection, directly from the interface 120 at the same premises 102. Accordingly, the system 500 may differentiate interfaces 120 presenting linear primary content from interfaces 120 presenting time-shifted programming content. For example, the synchronization manager 542 may be configured to determine whether a received detection signal D is generated in response to consumption of time-shifted primary content. If so, the synchronization manager 542 may transmit a unicast synchronization signal to the particular second screen device 302 being used to present second screen content SSC in synchronization with the time-shifted primary content.

Figure 6:
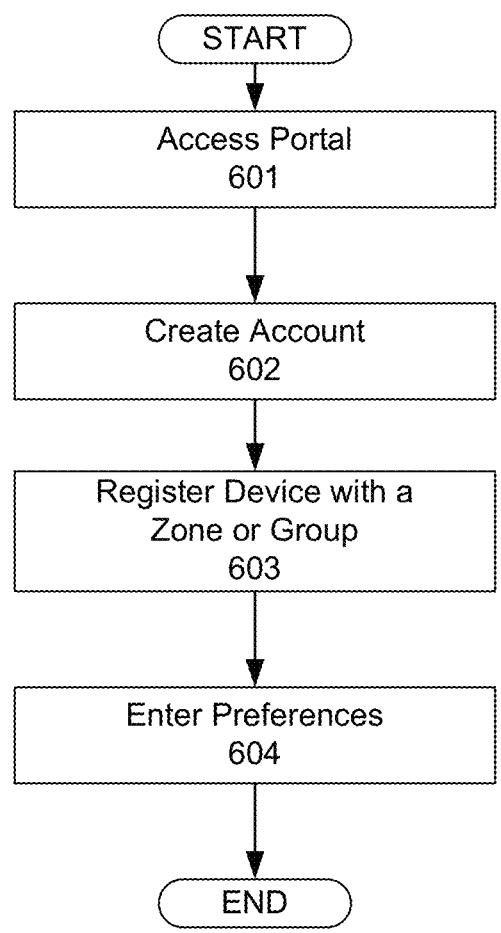
FIG. 6 is a flow diagram illustrating an example method according to one or more aspects of the disclosure.

FIG. 6 is a flow diagram illustrating an example method of the present application in which a second screen device 302 may be initially configured so that it can interface with the system of the present disclosure.

In step 601, a user may use a web browser to access a web portal. This can be done using the second screen device 302 or another device with Internet access. Once at the web portal, a user may create an account in step 602. This may be done by entering a username and/or a password. By creating an account, a user may subscribe to a service of the present disclosure that provides a synchronized second screen experience.

In step 603, a user can register his/her particular second screen device 302 with the service of the present disclosure so that synchronization signals and second screen content may be received by the second screen device 302. During this registration process, the user may associate a default interface 120, and therefore a default zone, with the second screen device 302 and/or with a username used to log into a second screen experience application on the second screen device 302. For example, a user in FIG. 5 might associate second screen device 302a with interface 120a. To accomplish this, a user may enter an interface 120 identifier (e.g., set top box serial number) or service provider account number into a second screen experience application of a second screen device 302, which may store the entered information on the second screen device 302 itself or in a computing device on the network 530. As a result, when the second screen device 302 is subsequently used to consume supplemental content, it can present the supplemental content for the appropriate zone based on the stored interface 120 identifier and/or service provider account number. It is contemplated that certain users might desire to synchronize second screen content on their second screen device 302 with primary content at a particular interface 120 (e.g., an interface 120 in their home) more often than other interfaces 120, so that the second screen device 302 may receive an appropriate synchronization signal. However, a user may later change the associated interface or account number, which may be desirable the user's residency changes, or temporarily override the association, which may be desirable when the user is consuming supplemental content at another person's home. During step 603, a user may associate a number of second screen devices 302 with the same interface 120. Alternatively, a username may be associated with an interface 120 so that any second screen device 302 running a second screen application which has been logged into using the username may be associated with that interface 210.

At the completion of step 603, an application on the second screen device 302 may have stored an interface 120 identifier. Thus, when the second screen device 302 subsequently sends a request for content, a computing device, such as the second screen content server 541 or the synchronization manager 542, may determine where (e.g., in which zone) the second screen device 302 is located. As a result, the second screen device 302 may receive the appropriate synchronization signals S1, S2 or synchronized second screen content.

In step 604, a user may designate the type of device so different signal formats can be sent depending on the device. Step 604 may also allow the user to enter other user preferences, such as preferences related to types of supplemental content (e.g., coupons, bonus videos, trivia questions, etc.) or parental controls to restrict access to certain second screen content. It is contemplated that different users consuming the same primary content C1, C2 within the same zone (and even through the same interface 120) may wish to receive different supplemental content. In other words, the second screen experience may be customized for users by providing a variety of supplemental content for any given piece of primary content C1, C2. Accordingly, the user preferences received in step 604 may be used by second screen devices 302 to control what supplemental content is received and/or presented. For example, a second screen device 302 may receive multiple versions of second screen content SSC for the same primary content and determine which version to present based on user preferences entered in step 604. Therefore, the user preferences may also be used to select which synchronization signal to use or control how synchronization is performed so that the presented second screen content SSC is synchronized with the primary content. Once preferences are submitted, a user profile associated with the account created in step 602 may exist. This user profile may be updated by returning to the web portal and editing the preferences.

Figure 7:
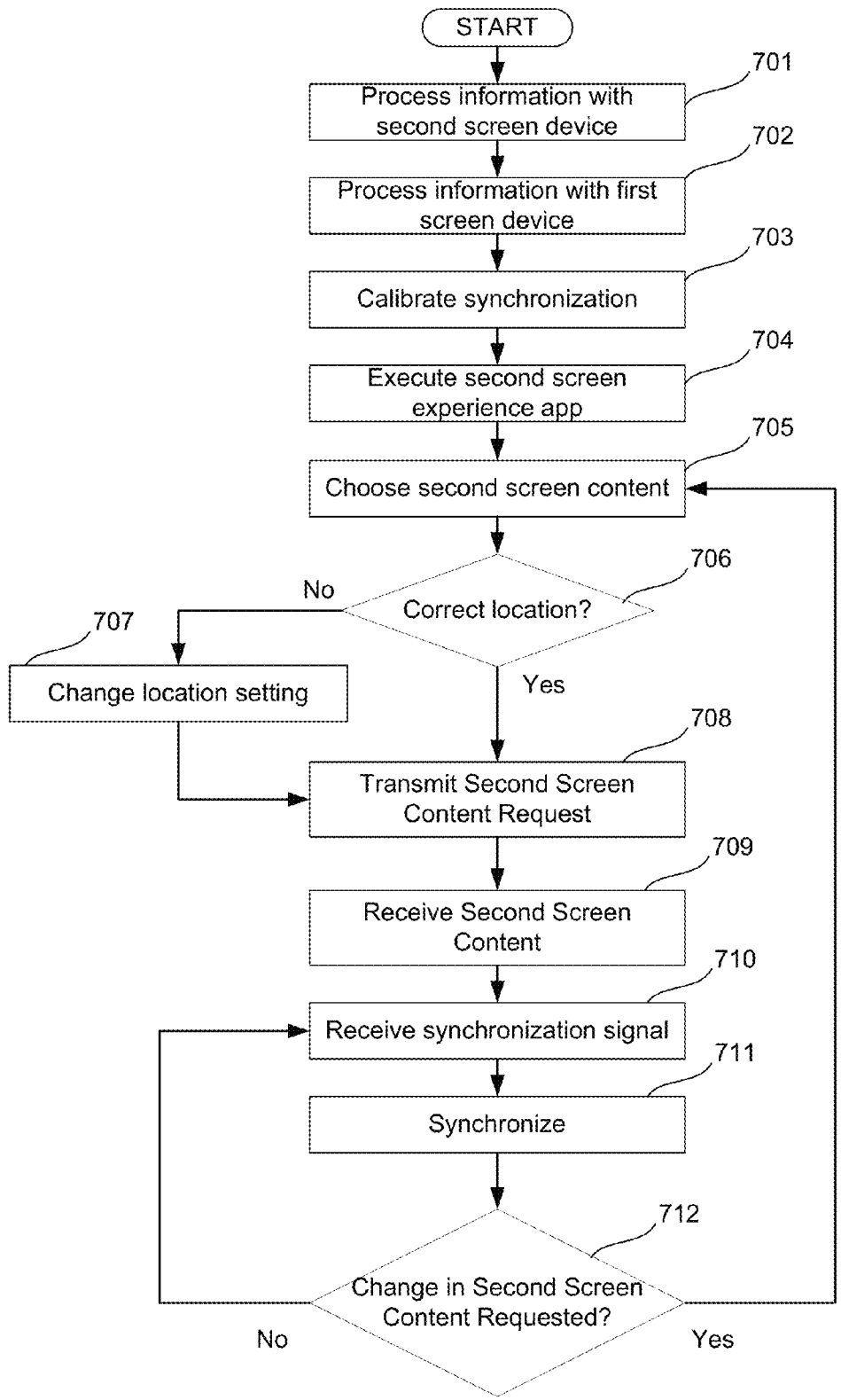
FIG. 7 is a flow diagram illustrating an example method according to one or more aspects of the disclosure.

FIG. 7 illustrates a process of operating a second screen device 302 to realize a second screen experience. In particular, FIG. 7 describes steps that a second screen device 302 may perform to synchronize second screen content presented thereon with primary content presented on a first screen device 301. By way of these steps, a user may control a second screen device 302 so that the user may consume second screen content in synchronization with primary content that the user simultaneously consumes via a first screen device 301.

The process of FIG. 7 may be performed after the process of FIG. 6 for registering the second screen device 302 is performed. In step 701, the second screen device 302 is turned on. This may include turning on, for example, a tablet, laptop, smartphone, etc. At step 702, the first screen device 301 may be turned on. When a first screen device 301 (e.g., a television, computer, etc.) is turned on, it may begin presenting content, such as a video program (e.g., a television program). In some cases, the second screen device 302 may be used to turn on the first screen device 301.

With the second screen device 302 turned on, synchronicity between the supplemental content on the second screen device 302 and the primary content on the first screen device 301 may be calibrated at step 703. For example, calibration may be performed using the second screen device 302 to account for a propagation delay of the primary content to the interface 120 and/or first screen device 301 or of the synchronization signal to the second screen device 302. The propagation delay may be a time elapsing from a time that the primary content is transmitted from, for example, the local office 103 to a time that the primary content reaches the first screen device 301 and/or interface 120, or a time elapsing from a time that a synchronization signal is transmitted from, for example, the synchronization manager 542 to a time that it reaches the second screen device 302. In some situations, primary content may be received by different interfaces 120 at different times although it is transmitted to the interfaces 120 at the same time. Also, second screen devices 302 within the same zone may receive synchronization signals at different times. To carry out calibration to account for such propagation delays, a second screen device 302 may connect to the interface 120 and/or first screen device 301 via a wired and/or wireless connection. Through the connection, the first screen device 301 and/or interface 120 may inform the second screen device 302 of the propagation delay. Specifically, the interface 120 and/or first screen device 301 may compute a propagation delay by comparing a time that primary content was transmitted with a time that the primary content was received and provide this information to the second screen device 302. Calibration may also be performed by a second screen device 302 by comparing a time when a dummy synchronization signal is transmitted to a time that it is received. This information may be used when presenting the second screen content SCS according to a synchronization signal S1, S2. In some embodiments, a test may be performed to achieve calibration. For example, a user may make a selection on the second screen device 302 in response to some event (e.g., the start of a television program, start/end of a commercial break, etc.) associated with the primary content presented on the first screen device 301 which may allow the second screen device 302 to compute a propagation delay. Although the calibration at step 703 is shown as occurring after step 702 and before step 704, it should be understood that the calibration may take place at other times in the process and/or may be performed multiple times.

At step 704, a user may operate the second screen device 302 to execute an application that is designed to provide an interface for users to consume second screen content SSC. In some examples, simply turning on the second screen device 302 may trigger the application to run, and thus, provide a second screen experience. The application may be stored on the second screen device 302. Once the application begins to run, a user may log into a second screen experience service. Logging-in may include providing a username and/or password or other identification information. By logging-in to the second screen experience, a user may enter the second screen device 302 into a service network so that the correct synchronization signals S1, S2 and/or second screen content SSC may be provided to the second screen device 302.

In step 705, a user may select second screen content SSC that the user wishes to download and/or consume. Specifically, a user may operate the application to specify second screen content SSC. The application may provide the user with a listing of second screen content SSC available for consumption. The listing may be sorted based on the primary content C1, C2 it is associated with. Accordingly, a user may enter or otherwise identify which primary content they are viewing in order to select the second screen content they would like to consume. That is, based on the selection of the primary content C1, C2 being consumed, the corresponding second screen content SSC may be selected. The second screen device 302 may communicate with the interface 120 and/or first screen device 301 to identify this selection. Further, where the second screen device 302 is used to turn on the first screen device 301 or tune the first screen device 301 to a particular channel or service, the second screen device 302 may automatically (e.g., without further user input) select the appropriate second screen content SSC based on the identification of the selected channel or service. Also, there might not be a requirement that the user is consuming the primary content C1, C2 associated with the second screen content SSC that the user selects. In other words, a user may select second screen content SSC even though he/she is not consuming the associated primary content C1, C2. Another optional feature of the application may be the ability to provide a preview of the second screen content SSC that is available for download.

Step 706 includes a step of determining whether the location of the second screen content SSC is to be changed. As mentioned with respect to FIG. 6, the second screen device 302 may be registered with a specific interface 120 and/or location. Specifically, the second screen device 302 may store a location setting for identifying the location (e.g., zone) for which the second screen device 302 will receive second screen content SSC. Because a user may frequently use the second screen device 302 to consume second screen content at his/her default location (e.g., a home), the location may be set to the default location whenever the user runs the application. The default location may be associated with a default zone, and therefore, the second screen device 302 may assume it is in the default zone unless it is instructed otherwise. However, it is contemplated that the second screen device 302 may be used at a location other than its default location. For example, a user may use his/her second screen device while at a friend's home in a different zone than the user's default zone, and therefore, may desire that his/her second screen content SSC be synchronized with the primary content C1, C2 delivered to the friend's home. In this case, a user may choose to change the location/zone setting on his/her second screen device 302. In some examples, the different location may be automatically detected using the second screen device's global positioning system (GPS) receiver or using location information obtained via a network (e.g., a cellular network or the Internet). In other examples, the second screen device 302 may detect that it is in a different location by communicating with the interface 120 at the different location. That is, the second screen device 302 may connect with the interface 120 at the different location, and through one or more communications with the interface 120, the second screen device 302 may be informed of its current location (e.g., zone).

If is determined that the second screen device 302 is in a different zone than its location setting currently indicates, the location setting may be updated at step 707. After the proper zone is indicated in the location setting, step 708 may be performed to transmit a request for second screen content SSC. The second screen content request may be transmitted by the second screen device 302 via a network 530 to a second screen content server 541 and/or a synchronization manager 542. The second screen content request may indicate the zone in which the second screen device 302 is located and/or the second screen content SSC desired by the user. In some cases, the second screen content request may include multiple signals. For example, one signal may indicate the zone in which the second screen device 302 is located and may be transmitted to the synchronization manager 542, while another signal may indicate the second screen content desired and may be sent to the second screen content server 541. In some cases, the zone might not be indicated, and the second screen content server 541, synchronization manager 542, and/or other computing device 200 on the network 530 may determine the zone associated with the second screen device 302 based on information stored in a profile associated with the second screen device 302. For example, the synchronization manager 542 may determine an identity of the second screen device 302 sending the second screen content request from an identifier in the request and determine the zone by referring to a profile set up for the second screen device as explained above with respect to FIG. 6.

In response to the request for second screen content SSC, at step 709, the second screen content server 541 may transmit the appropriate second screen content SSC to the second screen device 302 that sent the request. Accordingly, at step 709, the second screen device 302 may receive the second screen content SSC it requested. The second screen device 302 may display the second screen content SSC once it is received or may buffer the second screen content SSC until a synchronization signal S1, S2 is received.

Additionally, the second screen device 302 may receive a synchronization signal S1, S2 from the synchronization manager 542 at step 710. In some examples, the synchronization signal S1, S2 may be addressed to a particular second screen device 302 that sent the request for second screen content SSC. In other examples, one or more of the synchronization signals S1, S2 may be a multicast signal so as to be received by a plurality of second screen devices 302. Further, in some examples, the synchronization signals S1, S2 may be sent by the synchronization manager 542 in response to a detection signal D received from an interface 120 and/or the second screen content request. In other words, a detection signal D and/or the second screen content request may trigger the synchronization manager 542 to transmit the synchronization signals S1, S2. Subsequently, the second screen device 302 may synchronize the second screen content SSC with the primary content, which may be presented on a first screen device 301, according to a received synchronization signal S1, S2 at step 711. For example, referring to FIG. 5, the second screen device 302a may synchronize the second screen content SSC with the synchronization signal S1 so that relevant portions of the second screen content SSC may be presented depending on the portions of the primary content being presented on the first screen device 301.

Further, step 712 may be performed to determine whether there is a change in the second screen content SSC requested. The application on the second screen device 302 may check whether a user has requested different second screen content SSC. This determination may be made based on user provided input (e.g., user input selecting different second screen content SSC from a list) or a detection that the second screen device 302 was used to change the primary content presented on the first screen device 301. If it is determined that new second screen content SSC has not been requested (No at step 712), the process may return to step 710 and may wait to receive another synchronization signal S1, S2 in order to maintain synchronization. Meanwhile, if it is determined that new second screen content SSC has been requested (Yes at step 712), the process may return to step 705 to select the new second screen content SSC.

Figure 8:
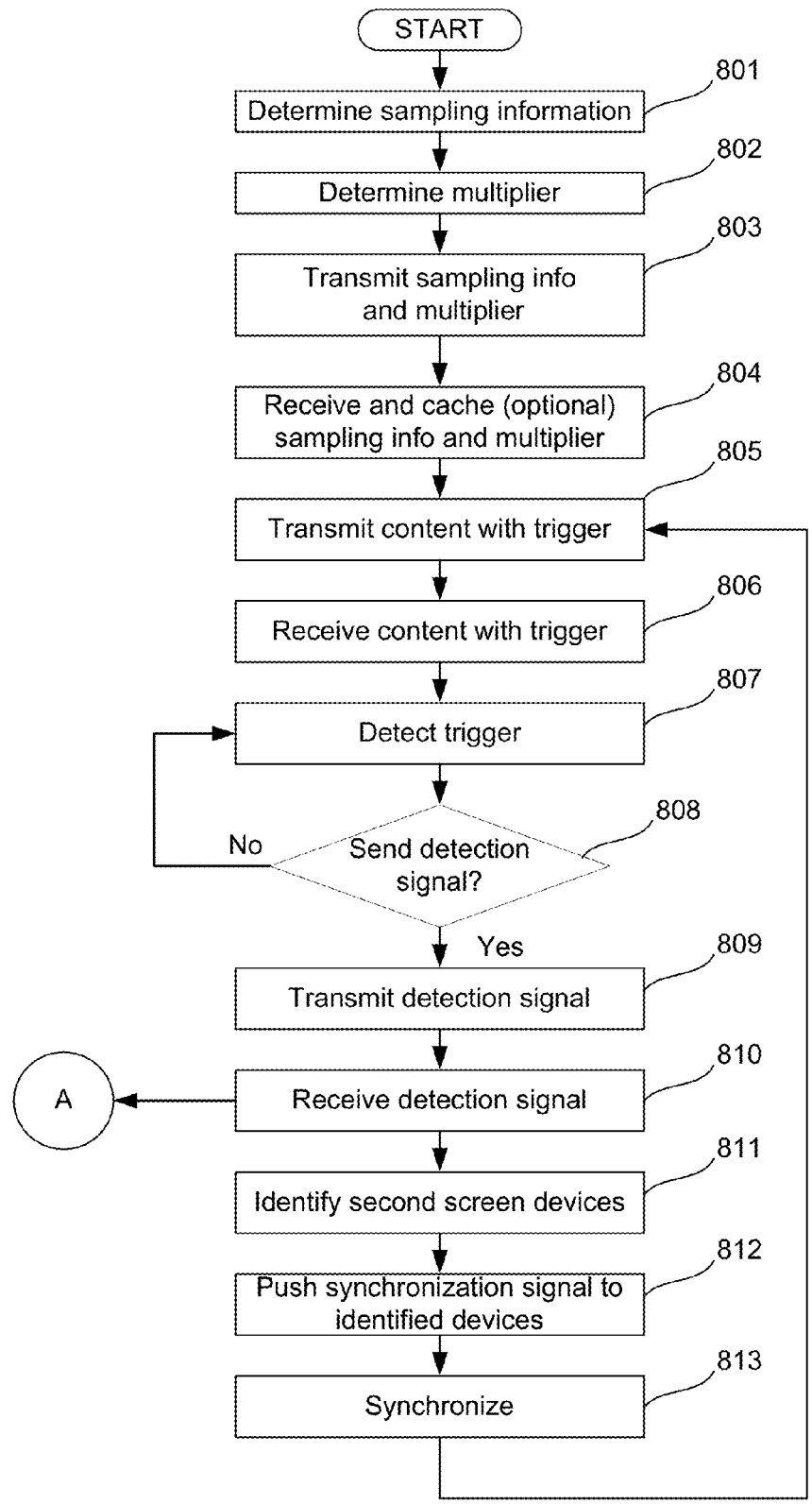
FIG. 8 is a flow diagram illustrating an example method according to one or more aspects of the disclosure.

FIG. 8 illustrates a method for providing a synchronized second screen experience. The method may begin with step 801 in which sampling information, representing statistical data, may be obtained. The sampling information may be based on statistical data collected that represents how many people consume certain primary content C1, C2. For example, polls and other ratings (e.g., Nielsen ratings) that provide an approximate number of people watching certain television shows at various times of day (e.g., clock times) may be used to generate the statistical data. Specifically, based on the ratings data, a percentage of detection signals D desired to be received from interfaces 120 for each piece of content C1, C2 at various times of day may be determined. In some embodiments, the sampling information may be generated using program guide information. For example, electronic program guide (EPG) information may be extracted and used to create the sampling information. Table 1 below shows a graphical representation of example sampling information that may be obtained and stored.

TABLE 1

| | Time of Day | | |
|---|---|---|---|
| | 8:00 am | 8:30 am | 9:00 am |
| Channel 25 | 5% | 9% | 10% |
| Channel 26 | | 7% | 20% |
| Channel 27 | 15% | 8% | 1% |
| Channel 28 | 60% | | 4% |
| Channel 29 | 3% | 12% | 5% |
| Channel 30 | 7% | 10% | 6% |

Referring to Table 1, the 5% in the cell for Channel 25 at 8:00 am indicates that 5% of the interfaces 120 expected to tune to Channel 25 at 8:00 am are desired to provide detection signals D to report detected triggers. Notably, the percentages of for each piece of primary content (e.g., television program) may be different so that a common number of detection signals may be received regardless of how many people are consuming the primary content. As discussed in more detail below, the interfaces 120 may use this sampling information to determine whether they should send detection signals D in response to detected triggers.

Further, the sampling information may be specific for a particular zone. In other words, different zones may have different sampling information, and therefore, a table similar to Table 1 may be determined for each zone. Moreover, the sampling information may change as ratings change. For example, if the primary content on channel 29 at 8:00 am becomes less popular, the percentage of 3% may be increased because the number of interfaces 120 tuned to that primary content may decrease, and a larger subset of those interfaces may be relied upon to provide the detection signals D for triggers within that primary content.

It should be understood that the data represented by Table 1 is just one example form that the sampling information may take. The sampling information may take other forms from which similar information may be derived. For example, instead of including percentages in the cells of Table 1, the cells could indicate numbers of expected viewers, and from such numbers, the interfaces 120 can determine how often they should report triggers.

It is recognized that the sampling information might not reflect actual viewership and/or that popularity of primary content may fluctuate. That is, fewer or more people than expected may be watching a particular channel at a particular time, and therefore, the amount of detection signals transmitted may be different than desired. Thus, it may become desirable to adjust the sampling information thereby fine-tuning the number of detection signals transmitted upstream in response to detected triggers. To allow for such an adjustment, a multiplier may be determined. For example, if it is determined that the percentage indicated in the sampling information is too high, and as a result, more than enough detection signals D are being received, then a multiplier may be determined which when multiplied by the percentage of the sampling information would decrease the percentage. For example, if the percentage of 60% for channel 28 at 8:00 am causes twice the amount of detection signals D than desired to be transmitted, a multiplier of 0.5 may be determined and sent to the interfaces 120 using the 60% so that those interfaces 120 will use an adjusted percentage of 30% (60%×0.5) to determine whether to report detection signals D going forward. In contrast, if the percentage of 10% for channel 25 at 9:00 am causes a quarter (¼) of the amount of detection signals D than desired to be transmitted, a multiplier of 4 may be determined and sent to the interfaces 120 using the 10% so that those interfaces 120 will use an adjusted percentage of 40% (10%×4) to determine whether to report detection signals D going forward.

A multiplier may be determined for each zone. Therefore, if fewer detection signals than expected are received from interfaces 120 in a first zone, while more detection signals than expected are received from interfaces 120 in a second zone, the multiplier for the first zone may be higher than that of the second zone. Multipliers may include a single value and may be determined at shorter intervals than the sampling information. Thus, transmission of the multipliers may use less bandwidth than transmission of updated sampling information.

Step 803 may include transmitting the sampling information and a multiplier from a local office 103, synchronization manager 542, or other computing device on the network 530 to one or more interfaces 120. The transmission at step 803 may be a multicast transmission in which the sampling information and multiplier are pushed to a plurality of interfaces 120. Further, this transmission may take place at a predetermined time. For example, the sampling information and multiplier may be transmitted downstream from the local office 103 to each interface 120 at a set time once a day. While transmission of the sampling information may be limited to conserve bandwidth, updated multipliers may be transmitted more frequently.

At step 804, the sampling information and multiplier may be received by one or more interfaces 120. The interfaces 120 may store the sampling information and multiplier in a local cache.

Step 805 illustrates that the local office 103 may also transmit the primary content C1, C2 having embedded triggers downstream to the interfaces 120. This primary content C1, C2 may originate at content providers. The primary content C1, C2 along with the embedded triggers may be received by the interfaces 120 at step 806. The interface 120 may include a receiver configured to tune to a particular frequency to pick up a particular channel among the primary content C1, C2.

Upon receiving the primary content C1, C2, the interfaces 120 may analyze the primary content C1, C2 to detect triggers embedded within the content at step 807. The triggers may be embedded within primary content C1, C2 at periodic intervals or at random intervals. Once a trigger is detected, the interface 120 may proceed to step 808. At step 808, each interface 120 that detects a trigger may determine whether it should send a detection signal D in response to detecting that particular trigger. In order to reduce upstream bandwidth, it may be desirable that not all interfaces 120 transmit a detection signal D in response to every trigger. For each trigger, only some interfaces 120 within a zone might send a detection signal D. Each interface 120 may make the determination on a trigger-by-trigger basis as to whether it should transmit a detection signal D. If the interface 120 determines not to send the detection signal D (No at step 808), the interface 120 may continue to monitor the primary content C1, C2 to detect another trigger. That is, the process may return to step 807 to detect the next trigger when the interface 120 determines not to transmit a detection signal D in response to the most recently detected trigger. Further details regarding the determination at step 808 will be described below.

If the interface 120 determines that it will transmit a detection signal D (Yes at step 808), the detection signal D may be generated and transmitted at step 809. The transmitted detection signal D may include an identifier to identify the primary content being presented on the first screen device 301, an identifier to identify the trigger that the detection signal D is being transmitted in response to, and/or time information indicating a time at which the trigger was detected (or a time at which the detection signal D is generated). The detection signal D may be transmitted to the synchronization manager 542 via the network 530 (e.g., the Internet). The detection signal D may be an IP packet (e.g., IPv4 or IPv6 packet) addressed to the synchronization manager 542.

The detection signal D may be received by the synchronization manager 542 at step 810. The synchronization manager 542 may decode the detection signal D to determine the zone that the interface 120, which transmitted the detection signal D, is located within. Further, the synchronization manager 542 may decode the detection signal D to determine which trigger the detection signal D was sent in response to. For example, the synchronization manager 542 may determine an identifier from within the detection signal D that identifies a trigger. From this identifier, the synchronization manager 542 may determine the zone that the detection signal D came from and/or the content that the trigger was embedded within. As shown in FIG. 8, receipt of the detection signal may trigger a monitoring process of FIG. 10 described in more detail below.

After receiving a detection signal D, the synchronization manager 542 may identify one or more second screen devices 302 to which a synchronization signal S1, S2 should be transmitted at step 811. Specifically, the synchronization manager 542 may determine which second screen devices 302 are in the same zone as the zone from which the detection signal D, received in step 810, is sent. This determination may be based on information stored in a database of the synchronization manager 542. The information may include a listing of all second screen devices 302 registered with a particular service and registered to have a particular default zone. Thus, for example, if the detection signal D received in step 810 was from an interface 120 in zone 2, the synchronization manager 542 may identify all second screen devices 302 that have been set with zone 2 as their default zone. In this example, the synchronization manager 542 may identify second screen devices 302 whether or not they are turned on or off and/or regardless of what they are currently being used for (e.g., the second screen devices 302 may be identified even though they are not being used to consume second screen content). In other cases, the synchronization manager 542 may identify only those second screen devices 302 that are currently operating within the same zone as the interface 120 that sent the detection signal D. As discussed above, a user may manipulate a second screen device 302 to specify the location (e.g., indicate the zone) in which the second screen device 302 is currently operating. This location information (e.g., the current zone of the second screen device 302) may be sent to the synchronization manager 542. Thus, when the synchronization manager 542 receives a detection signal D, the synchronization manager 542 may use the information it has received, specifying which second screen devices 302 are in which zones, to identify the second screen devices 302 that are currently operating in the same zone associated with the detection signal D. Further, the synchronization manager 542 may also keep track of what second screen content SSC is being requested from which second screen devices 302. Thus, in some examples, the second screen devices 302 identified by the synchronization manager 542 may be those second screen devices 302 that have requested the second screen content SSC associated with the same primary content C1, C2 that the detection signal D is associated with. Accordingly, for example, if a detection signal D was transmitted from zone 2, instead of identifying all second screen devices 302 in zone 2, the synchronization might only identify those second screen devices 302 in zone 2 that have requested second screen content SSC associated with the same primary content C1, C2 that the detection signal D is associated with.

Regardless of which second screen devices 302 are identified or how they are identified, the identified set of second screen devices 302 may be sent a synchronization signal in step 812. The synchronization signal may serve to notify second screen devices 302 of the portion or point in time of the primary content presented on the first screen device 301. Based on this information, the second screen device 302 may determine which portion of the second screen content SSC, which it has previously received, should be presented. Thus, the second screen device 302 may synchronize the second screen content SSC with the primary content C1, C2 presented on the first screen device 301 at step 813. For example, the second screen device 302 may use a segment number included within the synchronization signal S1, S2 to identify a portion of the primary content C1, C2 that is being presented on the first screen device 301 and to determine a corresponding portion of the second screen content SSC to present. Alternatively, the second screen device 302 may use time information included in the synchronization signal S1, S2 to identify a point in time of the primary content C1, C2 and to determine a corresponding portion of the second screen content SSC to present. Notably, the second screen content SSC may be indexed by time points of the primary content C1, C2 and/or segment numbers of the primary content C1, C2 so that the corresponding portions of the second screen content SSC can be determined from the information in the synchronization signals S1, S2.

In some examples, second screen content SSC may be indexed according to its own time points and/or segment numbers. In such examples, the synchronization manager 542 may translate the detection signals D into information indicating the time points and/or segment numbers of the second screen content SSC. The synchronization manager 542 may then generate and transmit synchronization signals S1, S2 including this information so that the second screen device 302 may use this information to extract the appropriate portion of second screen content SSC to present. In light of this disclosure, it should be understood that the second screen content SSC and primary content C1, C2 may be correlated with one another in various manners, and therefore, the synchronization signals S1, S2 may include various types of information that can be used by second screen devices 302 to synchronize the second screen content SSC with the primary content C1, C2.

Figure 9A:
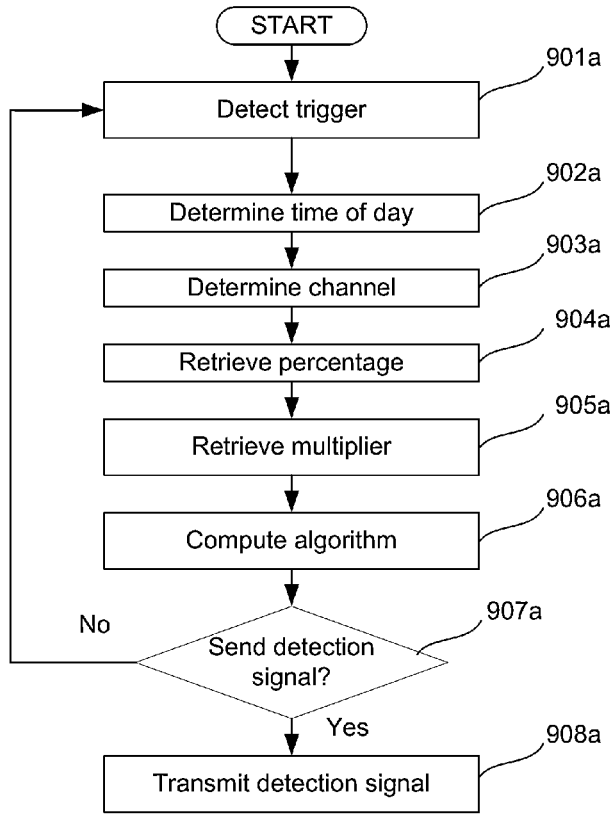
FIGS. 9A and 9B are flow diagrams illustrating example methods according to one or more aspects of the disclosure.

FIG. 9A illustrates a process that may be performed by an interface 120 in accordance with an aspect of the disclosure. More specifically, FIG. 9A shows steps that an interface 120 may perform to determine whether it should report a detected trigger. In other words, the steps of FIG. 9A allow an interface 120 to determine whether the interface 120 belongs to a subset of interfaces 120 that should report a detected trigger embedded within content. In some embodiments, the process of FIG. 9A may be performed in place of steps 807-809 of FIG. 8.

The process of FIG. 9A may begin with step 901a in which a trigger may be detected. Specifically, the interface 120 may monitor the primary content C1, C2 presented by a first screen device 301 connected to the interface 120 to detect one or more triggers embedded within the content C1, C2. The triggers may have a standard format so that the interface 120 may be configured to identify the standard format. For example, the interface 120 may be configured to identify EBIF triggers embedded within the primary content C1, C2.

Once a trigger is detected in step 901a, the interface 120 may determine time information at step 902a. The time information may indicate a time of day (e.g., 8:07 am) or a time period (e.g., 8:00 am to 8:30 am). The interface 120 may include an internal clock for this purpose. Alternatively, the interface 120 may extract time of day information from another signal or the trigger itself. Further, at step 903a, the interface 120 may determine a channel (e.g., television channel) or other identifier indicating the stream of primary content C1, C2 being presented on the first screen device 301. Based on the time information determined in step 902a and the channel determined in step 903a, the interface 120 may retrieve a value indicating a percentage of interfaces 120 that the system would like to report detection signals D. This percentage may be extracted from statistical information previously sent to the interface 120 or retrieved in response to detecting the trigger at step 901a. Where statistics (e.g., television ratings) demonstrate that the channel determined in step 903a at the time determined in step 902a receives low viewership, the percentage retrieved at step 904a may be relatively high so that the synchronization manager 542 can be guaranteed to receive a detection signal D. In contrast, where statistics (e.g., television ratings) demonstrate that the channel determined in step 903a at the time determined in step 902a receives high viewership, the percentage retrieved at step 904a may be relatively low so that the synchronization manager 542 can be guaranteed to receive a detection signal D without being overwhelmed with a high volume of detection signals D.

Additionally, at step 905a, an interface 120 may retrieve a multiplier. The interface 120 may receive multipliers relatively frequently, and therefore, the multiplier retrieved at step 905a may be the most recently received multiplier. The retrieved multiplier may be specific to the zone in which the interface 120 resides. The multiplier may be used to adjust the statistics on a zone-by-zone basis in realization that users in different zones may have different preferences. Moreover, the multiplier may provide a lightweight (in terms of payload) means for adjusting the statistics as time passes. The multiplier may offer a way to adjust the statistics when it is determined that the statistics are not accurately representing the present viewership. For example, a spike in viewership of a particular television program may result due to uncommon circumstances (e.g., a current event involving an actor may increase viewership of a television program featuring that actor), and the multiplier may allow for a real-time adjustment of the statistics.

Figure 9B:
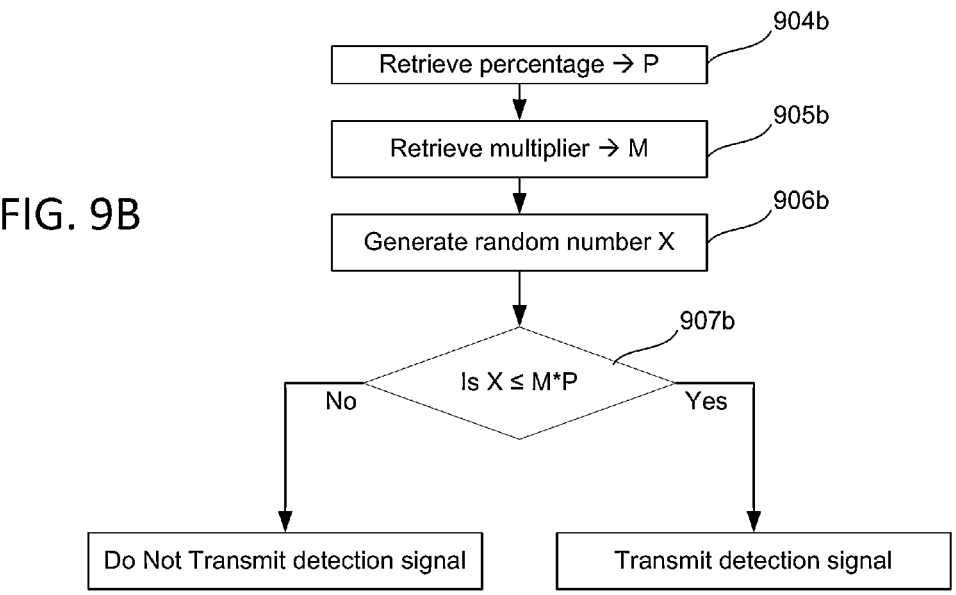

Using the percentage and multiplier, the interface may execute an algorithm at step 906a. The algorithm may be predetermined or provided to the interface 120 from an external source. The results of executing the algorithm may dictate whether the interface 120 sends a detection signal D. Various algorithms may be used in step 906a. The algorithms may take into account a random number, an identifier of the trigger, a MAC address of the interface 120, epoch time, and/or other factors in addition to the multiplier and percentage described above. FIG. 9B described below provides an example algorithm.

Regardless of the algorithm, step 907a may be performed to determine whether based on the results of the algorithm, the interface 120 should send a detection signal D. If the interface 120 determines that it should not send a detection signal D, the process may return to step 901a to detect the next trigger within the primary content C1, C2. However, if the interface 120 determines that it should send a detection signal D, the interface 120 may generate the detection signal D. Generating the detection signal D may encompass packaging an identifier of the trigger detected in step 901a in an IP packet having a header addressed to the synchronization manager 542. The interface 120 may then transmit the detection signal D, via the network 530, to the synchronization manager 542 at step 908a.

FIG. 9B illustrates an example process for determining whether to transmit a detection signal D. Step 904b illustrates that a percentage P may be retrieved from statistical information. Meanwhile, step 905b illustrates that a multiplier M may be retrieved. In an example algorithm of the disclosure, step 906b may include generating a random number X, where X is a value between 0 and 1. For example, step 906b may determine that X equals 0.065. Any means for generating a random number may be used. Although represented as a decimal number in this disclosure, the random number may be represented by a binary number, hexadecimal number, etc., and the algorithm may be modified accordingly.

After the random number is generated, the algorithm may be executed by the interface 120 at step 906b. In the example of FIG. 9B executing the algorithm may include computing M*P, where M is the multiplier and P is the percentage. The result of the computation may then be compared against the random number X at step 907b. If the random number X is less than or equal to the result, the interface 120 may determine that is should transmit a detection signal D. In contrast, if the random number X is greater than the result, the interface 120 might not transmit the detection signal D.

Figure 10:
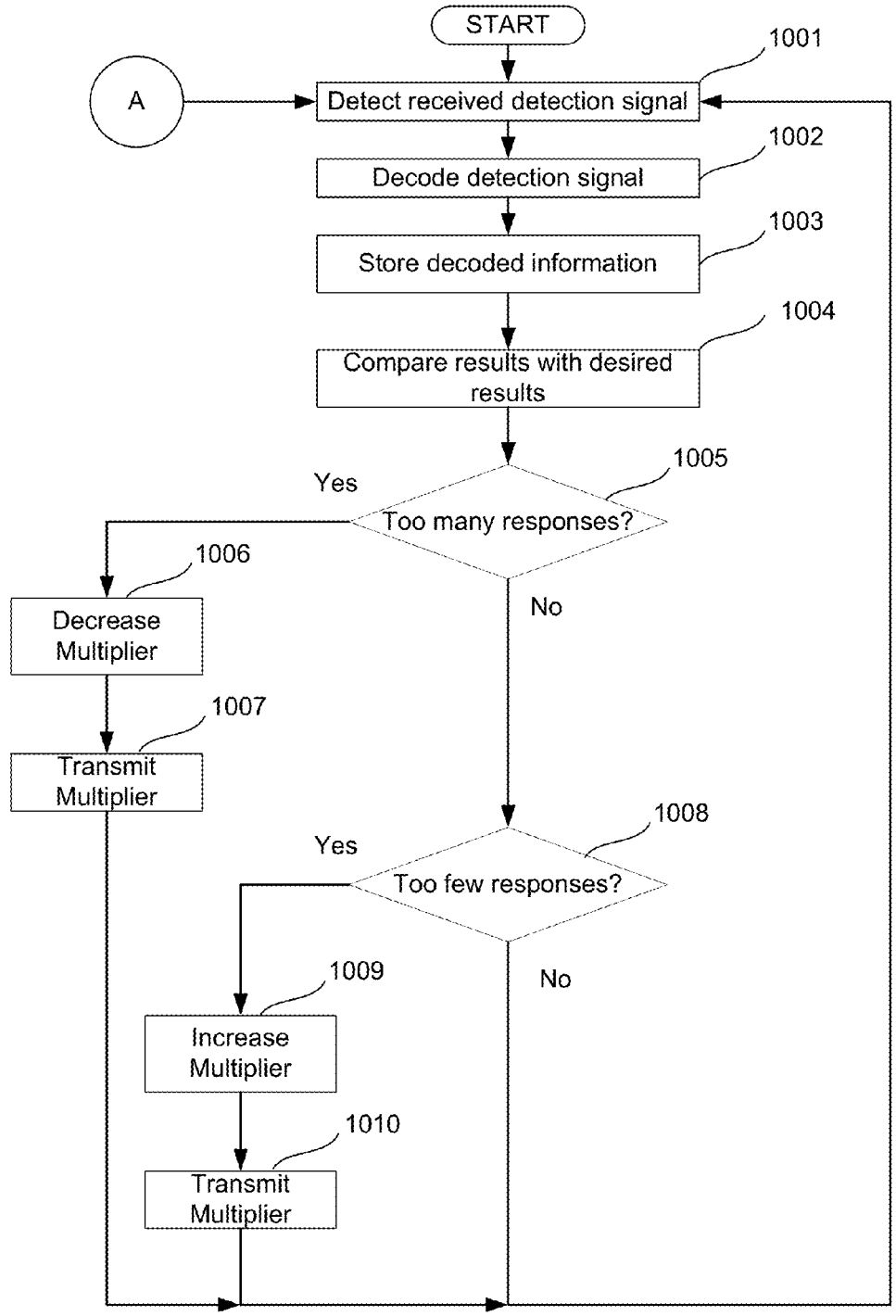
FIG. 10 is a flow diagram illustrating an example method according to one or more aspects of the disclosure.

FIG. 10 illustrates a process of managing the detection signal traffic. As described above, an aspect of the disclosure includes a process of selecting a subset of interfaces 120 to report detection signals D so that a plurality of second screen devices 302 may present second screen content SSC in synchronization with primary content C1, C2. Another aspect of the disclosure includes synchronizing second screen content SSC while optimizing network traffic. Specifically, multipliers may be used to optimize the size of the subset so that the number of interfaces 120 transmitting detection signals D is enough to provide a reliable synchronized experience, but not so many that network congestion results. FIG. 10 provides a process that monitors the number of detection signals D received, and adjusts multipliers in order to manage network traffic, and in particular upstream network traffic (e.g., data that flows from interfaces 120 upstream to the local office 103 and/or other devices on the network 530). The process of FIG. 10 may be performed by the synchronization manager 542 or another computing device (e.g., server) configured to receive detection signals D.

As shown in FIG. 10, the process of FIG. 10 may be initiated in response to receipt of a detection signal in step 810 of FIG. 8. The process of FIG. 10 begins with step 1001 in which a computing device (e.g., the synchronization manager 542 detects that a detection signal D has been received. In some examples, the process in FIG. 10 may be performed every time a detection signal D is received. In other examples, the process of FIG. 10 may only be executed after a certain number of detection signals D is received and/or after a certain point in time has elapsed, so that the synchronization manager 542 may have time to collect a sufficient sample of detection signals D. By changing the certain number or certain point in time for triggering the performance of the process of FIG. 10, the degree of sensitivity for monitoring the network traffic may be modified.

After receiving a detection signal D, the synchronization manager 542 may decode the detection signal D to determine an identifier of the detection signal D at step 1002. This identifier may correspond to an identifier of the trigger that prompted the detection signal D to be sent in the first place. From the identifier, the synchronization manager 542 may determine a zone in which the detection signal D originated. That is, the synchronization manager 542 may determine which zone the interface 120 that sent the detection signal D is located in. The synchronization manager 542 may also determine the identity of the primary content C1, C2 (and/or a portion thereof) containing the trigger that prompted the detection signal D to be transmitted. Additionally, or alternatively, the synchronization manager 542 may decode the detection signal D to identify the MAC address or IP address associated with the interface 120 that sent the detection signal D, and determine the zone of the interface 120 from this information. Further, the synchronization manager 542 may track MAC addresses and IP addresses of the interfaces 120 sending the detection signals D to verify that the system is working properly. If it is determined, based on collected MAC addresses or IP addresses, that a particular interface 120 is sending too many detection signals D, the synchronization manager 542 may alert an operator (or other admin istrative entity) that the system or the particular interface 120 might be malfunctioning.

The decoded information may be stored at step 1003. Specifically, the synchronization manager 542 may store, or cause another computing device to store (e.g., a database), information identifying the primary content C1, C2 having the trigger that caused the detection signal D to be sent, the zone from which the detection signal D was sent (or other location information, e.g., a MAC address), and/or a time that the detection signal D was transmitted (or received). Because many detection signals D may be received at the same time or within a short period of time from one another, the decoded information may be temporarily stored and discarded after a set period of time. In some examples, temporarily storing the decoded information may be sufficient because the decoded information might only be used to determine how many interfaces 120 are responding to the same trigger. Since the detection signals D received in response to the same trigger are expected to be received within a relatively short time period of one another, after a certain time period, the decoded information may be deleted from memory because it may be assumed that all of the detection signals D for that trigger should have been received.

In step 1004, the synchronization manager 542 may compare the stored information with desired results. For example, the synchronization manager 542 may evaluate the information stored in step 1003 to determine how many similar detection signals D are being received. Specifically, the synchronization manager 542 may count the number of detection signals D that were received from the same zone in response to the same trigger as the detection signal D received in step 1001. The synchronization manager 542 may then compare this sum to a predetermined value representing the desired results to determine whether the sum is greater than, less than, or equal to the predetermined value. In step 1004 of FIG. 10, only one sum may be calculated. However, because different detection signals D (e.g., detection signals D from different zones and in response to different triggers in the primary content C1, C2) may be received at step 1001, other sums may be calculated in other iterations of step 1004.

In step 1005, the synchronization manager 542 may determine whether too many responses to triggers (e.g., detection signals) are being received. Specifically, the synchronization manager 542 may determine whether the number of detection signals D received from a particular zone in response to a particular trigger exceeds the desired results based on the comparison in step 1004. An upper threshold may be used to determine what number is too many. For example, it may be acceptable to receive a certain number of detection signals D (e.g., 5 signals) over the desired results (e.g., 20 signals), but it may be considered too many if an upper threshold (e.g., 50 total signals) is exceeded. If too many responses are being received (Yes at step 1005), step 1006 may be performed to decrease a multiplier. By decreasing the multiplier, which interfaces 120 use to determine whether to send the detection signals D, the number of detection signals transmitted from the interfaces 120 may be reduced. As a result, the upstream bandwidth of the links 101 and the network 530 may be conserved and network congestion may be reduced. After the multiplier is decreased, the multiplier may be transmitted at step 1007 to each of the interfaces 120 in the zone identified as responding with too many detection signals D. Step 1007 may be performed periodically (e.g., once a day) or soon after the multiplier is decreased. By controlling when the multiplier is transmitted in step 1007, the system may be fine-tuned to balance reliability with network traffic. For example, by controlling step 1007 to transmit the multiplier once a day, the system may avoid over-reacting to uncommon circumstances.

If the synchronization manager 542 determines that there are not an excess number of responses (No at step 1005), step 1008 may be performed to determine whether too few responses are received. Specifically, the synchronization manager 542 may determine whether the number of detection signals D received from a particular zone in response to a particular trigger is less than the desired results based on the comparison in step 1004. A lower threshold may be used to determine what number of detection signals D is too few. For example, it may be acceptable to receive a certain number of detection signals D (e.g., 10 signals) below the desired results (e.g., 20 signals), but it may be considered too few if a lower threshold (e.g., 5 total signals) is not met. If too few responses are being received (Yes at step 1008), step 1009 may be performed to increase a multiplier. By increasing the multiplier, which interfaces 120 use to determine whether to send the detection signals D, the number of detection signals D transmitted from the interfaces 120 may be increased. As a result, the synchronization manager 542 may ensure that it receives enough detection signals D so that it can send a synchronization signal to provide a reliable synchronized experience for users of the second screen devices 302. After the multiplier is increased, the multiplier may be transmitted at step 1010 to each of the interfaces 120 in the zone identified as responding with too few detection signals D. Step 1010 may be performed periodically (e.g., once a day) or soon after the multiplier is decreased. By controlling when the multiplier is transmitted in step 1010, the system may be fine-tuned to balance reliability with network traffic.

If it is determined that a sufficient amount of detection signals D are received at step 1008, the process may return to step 1001 to continue to monitor subsequently received detection signals D. The process may also return to step 1001 after transmitting the adjusted multiplier in either steps 1007 or 1010.

Although example embodiments are described above, the various features and steps may be combined, divided, omitted, and/or augmented in any desired manner, depending on the specific secure process desired. For example, the process of FIG. 8 may be modified so that step 802 is performed before or at the same time that step 801 is performed. Additionally, although second screen experiences are contemplated as being implemented on two separate devices (a first screen device 301 and a second screen device 302), aspects of the disclosure may be enjoyed/implemented on one device having two viewing areas. For example, a second screen experience may be implemented on a single device (e.g., a television) using picture-in-picture to present both primary content and supplemental content simultaneously. This patent should not be limited to the example embodiments described, but rather should have its scope determined by the claims that follow.

We claim:

1. A method comprising:
    transmitting, by a computing device and to a plurality of interfaces, sampling information;
    receiving, by the computing device and from a first subset of the plurality of interfaces, one or more trigger detection signals indicating receipt of a particular trigger at the first subset of the plurality of interfaces, the first subset of the plurality of interfaces being determined based on the sampling information;

generating, by the computing device, a synchronization signal based on the one or more trigger detection signals;

transmitting, by the computing device, to a plurality of second devices, and to cause the plurality of second devices to output supplemental content in synchronization with content being output by a plurality of first devices, respectively, the synchronization signal; and transmitting an adjustment value to the plurality of interfaces to cause the plurality of interfaces to adjust the sampling information.

2. The method of claim 1, further comprising:
providing content to the plurality of interfaces, wherein the content comprises at least one trigger configured to cause the first subset of the plurality of interfaces to transmit the one or more trigger detection signals.

3. The method of claim 1, further comprising determining the sampling information based on a measurement of consumption by the plurality of interfaces.

4. The method of claim 1, further comprising determining a size of the first subset of the plurality of interfaces for a particular channel at a particular time, wherein the sampling information indicates the size of the first subset of the plurality of interfaces.

5. The method of claim 1, further comprising determining the adjustment value based on a number of the one or more trigger detection signals received by the computing device.

6. The method of claim 1, further comprising:
decoding at least one of the one or more trigger detection signals to determine a zone; and
selecting the plurality of second devices based on an association of the plurality of second devices with the zone.

7. The method of claim 1, wherein the generating the synchronization signal comprises generating the synchronization signal to indicate a particular portion of the supplemental content to be output by the plurality of second devices in synchronization with a particular portion of the content being output by the plurality of first devices.

8. The method of claim 1, further comprising:
receiving, from a particular second device among the plurality of second devices, a request for the supplemental content;
determining a group associated with the particular second device;
determining the supplemental content based on the request; and
transmitting the supplemental content to the particular second device.

9. The method of claim 8, wherein the generating the synchronization signal comprises generating the synchronization signal further based on the group.

10. The method of claim 8, further comprising:
receiving, from the particular second device, a second request for the supplemental content; and
determining, based on the second request, whether the group associated with the particular second device has changed.

11. The method of claim 10, further comprising:
in response to determining that the group has changed, generating a second synchronization signal specific to a second group; and
transmitting the second synchronization signal to the particular second device.

12. The method of claim 1, further comprising:
associating the plurality of second devices with a group, wherein the transmitting the synchronization signal comprises multicasting the synchronization signal to the group.

13. The method of claim 1, further comprising:
receiving, by the computing device and from a second subset of the plurality of interfaces, one or more second trigger detection signals indicating receipt of the particular trigger at the second subset of the plurality of interfaces, wherein the second subset of the plurality of interfaces is different from the first subset of the plurality of interfaces;
generating, by the computing device, a second synchronization signal based on the one or more second trigger detection signals; and
transmitting, by the computing device, the second synchronization signal to a second plurality of second devices to cause the second plurality of second devices to output the supplemental content in synchronization with the content being output by a second plurality of first devices, respectively.

14. The method of claim 1, wherein the transmitting the sampling information comprises transmitting information configured to cause transmission of a target number of the one or more trigger detection signals by the first subset of the plurality of interfaces.

15. The method of claim 1, wherein the first subset of the plurality of interfaces is determined based on the sampling information after the sampling information is adjusted using the adjustment value.

16. A method comprising:
generating, by a computing device, information indicating whether a device is selected to transmit a trigger detection signal;
transmitting, by the computing device and to a plurality of devices, the information;
receiving, from a subset of the plurality of devices, one or more trigger detection signals indicating receipt of a particular trigger at the subset of the plurality of devices;
generating a synchronization signal based on the one or more trigger detection signals;
transmitting the synchronization signal to a plurality of second-screen devices to cause the plurality of second-screen devices to output supplemental content in synchronization with content being output by a plurality of first-screen devices, respectively; and
transmitting an adjustment value to the plurality of devices to cause the plurality of devices to update the information.

17. The method of claim 16, further comprising:
prior to the transmitting the adjustment value, determining the adjustment value based on a number of the one or more trigger detection signals received.

18. The method of claim 16, wherein the generating the synchronization signal comprises determining a portion of the supplemental content to be output by the plurality of second-screen devices in synchronization with a corresponding portion of the content being output by the plurality of first-screen devices.

19. The method of claim 16, wherein the transmitting the information comprises transmitting information that causes the subset of the plurality of devices to transmit a target number of the one or more trigger detection signals.

20. A method comprising:

transmitting content to a first interface and a second interface;

receiving, by a computing device, a trigger detection signal from one of the first interface and the second interface that is selected based on sampling information, the trigger detection signal indicating detection of a trigger within the content;

generating, by the computing device, a synchronization signal based on the trigger detection signal;

transmitting the synchronization signal to a first portable device to cause the first portable device to output supplemental content in synchronization with the content being output by a first display device associated with the first interface;

transmitting the synchronization signal to a second portable device to cause the second portable device to output the supplemental content in synchronization with the content being output by a second display device associated with the second interface; and transmitting an adjustment value to the first interface and the second interface to cause the first interface and the second interface to adjust the sampling information.

21. The method of claim 20, further comprising:

decoding the trigger detection signal to obtain a zone; and selecting the first portable device and the second portable device based on an association of the first portable device and the second portable device with the zone.

22. The method of claim 20, further comprising:

identifying the trigger based on the trigger detection signal;

comparing a number of times the trigger detection signal is received by the computing device with a threshold number;

determining whether to adjust the adjustment value based on the comparing;

adjusting the adjustment value, wherein the transmitting the adjustment value comprises transmitting the adjusted adjustment value; and receiving, by the computing device, a second trigger detection signal from both the first interface and the second interface that are selected based on the sampling information and the adjusted adjustment value.

23. The method of claim 20, further comprising:

transmitting, to a plurality of interfaces comprising the first interface and the second interface, the sampling information, wherein the sampling information comprises information that causes less than all of the plurality of interfaces to transmit trigger detection signals.

* * * * *

UNITED STATES PATENT AND TRADEMARK OFFICE
CERTIFICATE OF CORRECTION

| | |
|---|---|
| PATENT NO. | : 9,553,927 B2 |
| APPLICATION NO. | : 13/798843 |
| DATED | : January 24, 2017 |
| INVENTOR(S) | : Sharma et al. |

It is certified that error appears in the above-identified patent and that said Letters Patent is hereby corrected as shown below:

In the Specification

Column 11, Detailed Description, Line 20:
Please delete "102a" and insert --120a-- therefor Column 11, Detailed Description, Line 22:
Delete "102b." and insert --120b.-- therefor Column 16, Detailed Description, Line 17:
Delete "210." and insert --120.-- therefor Signed and Sealed this
Nineteenth Day of March, 2024

Katherine Kelly Vidal
*Director of the United States Patent and Trademark Office*